US012776084B2

(12) United States Patent
Mun et al.

(10) Patent No.: US 12,776,084 B2
(45) Date of Patent: Oct. 27, 2026

(54) ELECTRONIC DEVICE FOR GENERATING IMAGE AND METHOD OF OPERATING SAME

(71) Applicant: SAMSUNG ELECTRONICS CO., LTD., Suwon-si (KR)

(72) Inventors: Jihun Mun, Suwon-si (KR); Moonsoo Kim, Suwon-si (KR); Sungguk Nam, Suwon-si (KR); Chulju Yang, Suwon-si (KR); Nagyeom Yoo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 74 days.

(21) Appl. No.: 19/037,814

(22) Filed: Jan. 27, 2025

(65) Prior Publication Data

US 2025/0247606 A1 Jul. 31, 2025

Related U.S. Application Data

(63) Continuation of application No. PCT/KR2025/001299, filed on Jan. 23, 2025.

(30) Foreign Application Priority Data

Jan. 29, 2024 (KR) ........................ 10-2024-0013050
Mar. 11, 2024 (KR) ........................ 10-2024-0034045

(51) Int. Cl.
*H04N 23/63* (2023.01)
*G06T 11/60* (2026.01)

(52) U.S. Cl.
CPC .......... *H04N 23/632* (2023.01); *G06T 11/60* (2013.01)

(58) Field of Classification Search
CPC ......... G06T 11/60; H04N 23/632; G06F 3/00; G06F 3/04842; G06F 3/04845; G06F 3/14; G06N 3/0475; G06Q 50/10; G06V 40/16

(Continued)

(56) References Cited

U.S. PATENT DOCUMENTS 8,564,682 B2 * 10/2013 Kim ........................ G06T 11/00 348/222.1
8,681,702 B2 * 3/2014 Tiwari .................. H04W 48/18 455/435.2

(Continued)

FOREIGN PATENT DOCUMENTS

CN 105120149 A 12/2015
CN 115775400 A 3/2023

(Continued)

OTHER PUBLICATIONS

Communication dated Apr. 29, 2025, issued by the International Searching Authority in International Application No. PCT/KR2025/001299 (PCT/ISA/210 and PCT/ISA/237).

*Primary Examiner* — Pritham D Prabhakher
(74) *Attorney, Agent, or Firm* — Sughrue Mion, PLLC

(57) ABSTRACT

An electronic device includes a camera, a display, at least one processor, and memory storing instructions that, when executed by the at least one processor, cause the electronic device to display, via the display, a first image, display, via the display, a preview image concurrently with the first image, the preview image being obtained by the camera, identify a second object in the preview image, based on the second object, identify a first object in the first image that is related to the second object in the preview image, generate a second image by editing the first image using a generative artificial intelligence (AI) model such that at least a portion (Continued)

of the first object is transformed based on the second object, and display, via the display, the second image.

20 Claims, 22 Drawing Sheets

(58) Field of Classification Search
USPC ..................................................... 348/207.99
See application file for complete search history.

(56) References Cited

U.S. PATENT DOCUMENTS

| | | | | |
|---|---|---|---|---|
| 10,511,758 | B2 * | 12/2019 | Hong | G06V 40/10 |
| 10,901,574 | B2 * | 1/2021 | Seol | G06F 3/0481 |
| 10,977,491 | B2 * | 4/2021 | Kim | G06F 16/434 |
| 11,138,434 | B2 * | 10/2021 | Lee | G06T 11/60 |
| 11,481,943 | B2 * | 10/2022 | Imoto | G06T 11/60 |
| 11,949,978 | B2 * | 4/2024 | Wu | G06T 5/77 |
| 12,316,955 | B2 * | 5/2025 | Cheon | H04N 23/695 |
| 12,363,422 | B2 * | 7/2025 | Kim | H04N 23/64 |
| 12,489,985 | B2 * | 12/2025 | Jeong | G06V 10/25 |
| 12,494,082 | B2 * | 12/2025 | He | G06V 20/653 |
| 12,542,965 | B2 * | 2/2026 | Zhou | H04N 23/60 |
| 12,574,636 | B2 * | 3/2026 | Youn | G06V 10/22 |
| 12,579,703 | B1 * | 3/2026 | Han | G06F 40/40 |
| 12,621,557 | B2 * | 5/2026 | Youn | H04N 23/611 |
| 2010/0321534 | A1 | 12/2010 | Kim | |
| 2012/0044869 | A1 | 2/2012 | Tiwari | |
| 2016/0196284 | A1 | 7/2016 | Kanda | |
| 2017/0026565 | A1 | 1/2017 | Hong et al. | |
| 2017/0169570 | A1 | 6/2017 | Vashishtha et al. | |
| 2018/0052571 | A1 | 2/2018 | Seol et al. | |
| 2018/0276473 | A1 * | 9/2018 | Kim | G06V 10/235 |
| 2020/0265234 | A1 | 8/2020 | Lee et al. | |
| 2021/0142543 | A1 | 5/2021 | Imoto et al. | |
| 2022/0159183 | A1 * | 5/2022 | Li | H04N 5/772 |
| 2022/0279116 | A1 | 9/2022 | Zhou | |
| 2023/0076342 | A1 * | 3/2023 | Kim | H04N 5/2621 |
| 2023/0100427 | A1 | 3/2023 | He et al. | |
| 2023/0188845 | A1 | 6/2023 | Youn et al. | |
| 2023/0217097 | A1 | 7/2023 | Wu et al. | |
| 2023/0237629 | A1 | 7/2023 | Lee et al. | |
| 2023/0260177 | A1 * | 8/2023 | Choi | G06F 3/011 345/173 |
| 2023/0300451 | A1 * | 9/2023 | Cheon | H04M 1/0241 348/240.2 |
| 2023/0376188 | A1 * | 11/2023 | Kim | H04M 1/02 |
| 2024/0040234 | A1 * | 2/2024 | Youn | H04N 23/611 |
| 2024/0089609 | A1 | 3/2024 | Jeong | |

FOREIGN PATENT DOCUMENTS

| | | | |
|---|---|---|---|
| JP | 6403368 | B2 | 9/2018 |
| JP | 2020 177605 | A | 10/2020 |
| JP | 7500768 | B2 | 6/2024 |
| KR | 10 2010 0136833 | A | 12/2010 |
| KR | 10-2012-0018738 | A | 3/2012 |
| KR | 10-2014-0127131 | A | 11/2014 |
| KR | 10 2020 0101206 | A | 8/2020 |
| KR | 10 2022 0026252 | A | 3/2022 |
| KR | 10-2022-0073843 | A | 6/2022 |
| KR | 10 2411943 | B1 | 6/2022 |
| KR | 10 2429427 | B1 | 8/2022 |
| KR | 10 2692338 | B1 | 8/2024 |

* cited by examiner

ELECTRONIC DEVICE FOR GENERATING IMAGE AND METHOD OF OPERATING SAME

CROSS-REFERENCE TO RELATED APPLICATIONS

This application is a continuation application of International Application No. PCT/KR2025/001299, filed on Jan. 23, 2025, in the Korean Intellectual Property Receiving Office, which is based on and claims priority to Korean Patent Application No. 10-2024-0013050, filed on Jan. 29, 2024, in the Korean Intellectual Property Office, and Korean Patent Application No. 10-2024-0034045, filed on Mar. 11, 2024, in the Korean Intellectual Property Office, the disclosures of which are incorporated by reference herein in their entireties.

BACKGROUND

1. Field

The disclosure relates to an electronic device for generating an image and a method of operating the same.

2. Description of Related Art

With the development of information communication technologies, semiconductor technologies, and the like, the supply and use of various electronic devices are rapidly increasing. Electronic devices are being developed to perform communication while users carry the electronic devices. An electronic device may refer to a device that performs a specific function according to an installed program, such as a mobile communication terminal, a tablet personal computer (PC), a video/sound device, a desktop/laptop computer, or a vehicle navigation device.

Recently, users are greatly interested in acquiring high-quality images provided by high-end camera equipment, beyond simply capturing and acquiring images using the electronic device. The electronic device provides a function of editing an image. The electronic device may provide a user with an environment in which an image stored in the electronic device can be edited using an image editing application.

SUMMARY

Additional aspects will be set forth in part in the description which follows and, in part, will be apparent from the description, or may be learned by practice of the presented embodiments.

According to an aspect of the disclosure, an electronic device may include a camera, a display, at least one processor, and memory storing instructions that, when executed by the at least one processor, cause the electronic device to display, via the display, a first image, display, via the display, a preview image concurrently with the first image, the preview image being obtained by the camera, identify a second object in the preview image, based on the second object, identify a first object in the first image that is related to the second object in the preview image, generate a second image by editing the first image using a generative artificial intelligence (AI) model such that at least a portion of the first object is transformed based on the second object, and display, via the display, the second image.

The instructions, when executed by the at least one processor, may further cause the electronic device to identify metadata information about the first image, the metadata information including at least one of focal length information, shutter speed information, and location information of the first object, and generate the second image based on the second object and the metadata information.

The instructions, when executed by the at least one processor, may further cause the electronic device to display the preview image on the first image while not overlapping the first object in the first image.

The instructions, when executed by the at least one processor, may further cause the electronic device to display, via the display, the second image in real time.

The instructions, when executed by the at least one processor, may further cause the electronic device to identify the first object in the first image and replace the first image with a third image in which a portion corresponding to the first object is enlarged.

The instructions, when executed by the at least one processor, may further cause the electronic device to display, via the display, the preview image together with the second image, and in response to a user input corresponding to the preview image, generate an image file corresponding to the second image.

The instructions, when executed by the at least one processor, may further cause the electronic device to display, via the display, a graphic object, and in response to a user input corresponding to the graphic object, display the preview image on the first image.

The instructions, when executed by the at least one processor, may further cause the electronic device to perform a face detection function on the preview image, and identify a user's face in the preview image as the second object based on the face detection function.

The instructions, when executed by the at least one processor, may further cause the electronic device to, based on performing a face recognition function on the user's face, identify, as the first object, a face in the first image corresponding to the user's face in the preview image among at least one face in the first image.

The instructions, when executed by the at least one processor, further cause the electronic device to generate the second image by performing in-painting on the first image using the generative AI model.

The instructions, when executed by the at least one processor, may further cause the electronic device to generate at least two text prompts with respect to characteristics of the second object, and generate the second image based on the at least two text prompts and the second object using the generative AI model.

The instructions, when executed by the at least one processor, may further cause the electronic device to generate the second image by transmitting information comprising at least one portion of the first image and the second object to an external server configured to generate the second image using the generative AI model, the generative AI model being stored in the external server, and receive the second image from the external server.

The instructions, when executed by the at least one processor, may further cause the electronic device to identify at least one third image including a third object corresponding to the first object, generate at least one fourth image using the generative AI model such that at least a portion of the third object is transformed based on the second object, and display, via the display, the at least one fourth image.

The preview image may be obtained by an external electronic device, and the instructions, when executed by the at least one processor, may further cause the electronic device to receive the preview image from the external electronic device.

According to an aspect of the disclosure, a method of operating an electronic device may include displaying a first image via a display of the electronic device, displaying, via the display, a preview image concurrently with the first image, the preview image being obtained by a camera of the electronic device, identifying a second object in the preview image, identifying, based on a portion of the second object, a first object in the first image that is related to the second object in the preview image, generating a second image by editing the first image using a generative AI model such that a portion of the first object is transformed based on the portion of the second object, and displaying, via the display, the second image.

The generating of the second image may include identifying metadata information about the first image, the metadata information including at least one of focal distance information, shutter speed information, and location information of the first object, and generating the second image, based on the portion of the second object and the metadata information.

The displaying of the preview image may include displaying the preview image on the first image while not overlapping the first object in the first image.

The displaying of the second image may include displaying the second image in real time.

The method may include identifying the first object in the first image, and replacing the first image with a third image in which corresponding to the first object is enlarged.

According to an aspect of the disclosure, a non-transitory computer-readable recording medium may store instructions that, when executed by at least one processor, cause the at least one processor to display a first image stored in a memory, display a preview image concurrently with the first image, the preview image being obtained by a camera, identify a second object in the preview image, identify, based on a portion of the second object, a first object in the first image that is related to the second object in the preview image, generate a second image by editing the first image using a generative AI model such that a portion of the first object is transformed based on the portion of the second object, and display the second image.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
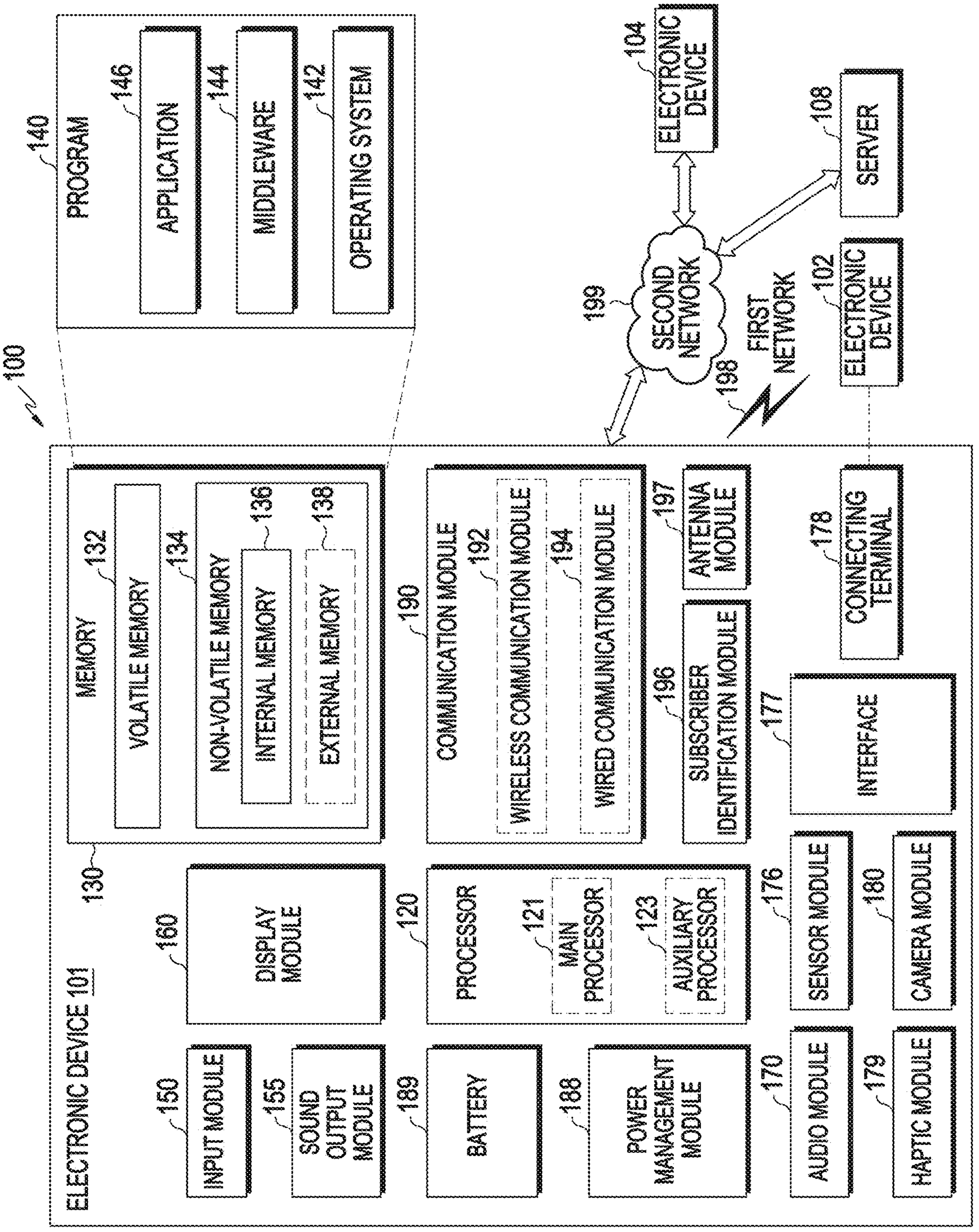
FIG. 1 is a block diagram of an electronic device within a network environment according to one or more embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to an embodiment, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
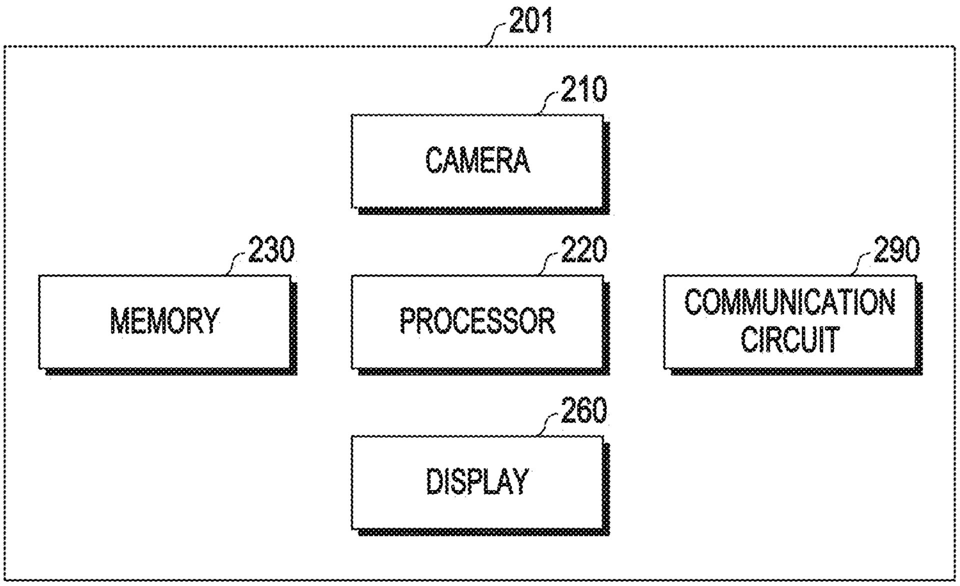
FIG. 2 is a block diagram illustrating a schematic configuration of the electronic device according to one or more embodiments.

FIG. 2 is a block diagram illustrating a schematic configuration of an electronic device according to one or more embodiments.

Referring to FIG. 2, according to one or more embodiments, an electronic device 201 may include a camera 210, a processor 220, memory 230, a display 260, and a communication circuit 290. For example, the electronic device 201 may be implemented to be the same as or similar to the electronic device 101 of FIG. 1.

The processor 220 (for example, the processor 120 of FIG. 1) according to one or more embodiments may control the overall operation of the electronic device 201. The processor 220 according to one or more embodiments may execute software (for example, the programs 140 of FIG. 1) to control at least one other component (for example, hardware or software components of the electronic device 201 connected to the processor 220) and perform data processing or calculations, based on instructions. The instructions according to one or more embodiments may include machine language instructions that can be processed by the electronic device 201 or the processor 220. For example, the instructions may include instructions corresponding to operation indications used in the programs.

Although FIG. 2 illustrates that the electronic device 201 includes one processor 220, it is only an example and the technical idea of the disclosure is not limited thereto. For example, the electronic device 201 may include at least one processor. For example, the processor 220 may be implemented as at least one processor (e.g., a plurality of processors).

According to one or more embodiments, the memory 230 (for example, the memory 130 of FIG. 1) may store at least one instruction that, when executed, causes at least one operation of the electronic device 201. At least one instruction may cause the electronic device 201 to perform a corresponding operation when executed collectively or individually by the processor 220.

Figure 3:
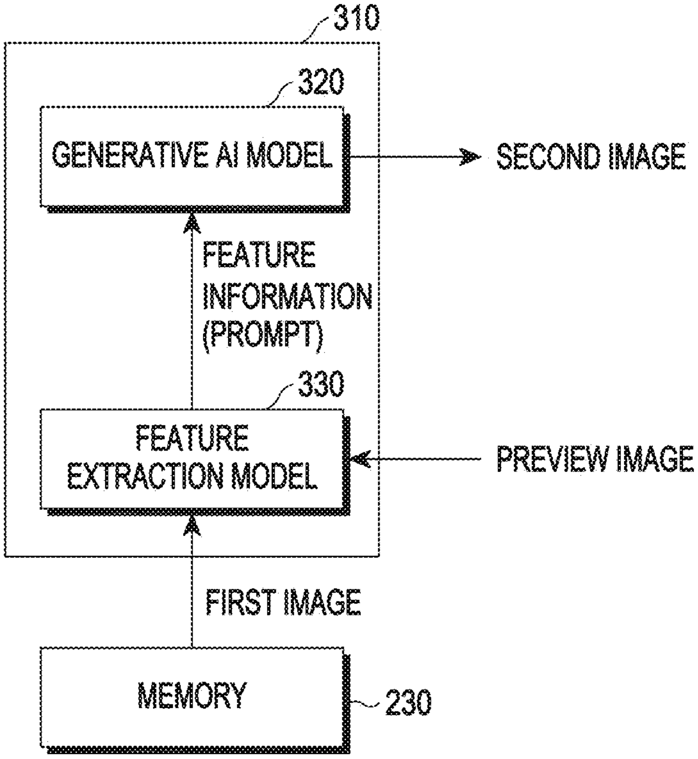
FIG. 3 is a block diagram schematically illustrating an image generation model according to one or more embodiments.

According to one or more embodiments, the processor 220 may convert (acquire, generate, or convert) a first image into a second image by using an image generation model (for example, an image generation model 310 of FIG. 3). For example, the processor 220 may generate the second image by using a generative artificial intelligence (AI) model 320 such that at least a portion of a first object (for example, a face) included in the first image is transformed based on at least a portion of a second object (for example, face) included in an image (for example, a preview image or a live preview image) acquired in real time through the camera 210. For example, the processor 220 may acquire or generate the second image in which at least the portion of the first object included in the first image is transformed to at least the portion of the second object included in the image (for example, the preview image) acquired through the camera 210. For example, the first image may indicate an image to be edited. The second image may indicate an edited image. For example, the first image may be stored in the memory 230 (for example, the memory 130 of FIG. 1) or an external server (for example, a cloud server, server 108 of FIG. 1). For example, when the first image is stored in the external server, the processor 220 may receive the first image through the communication circuit 290 (for example, the communication module 190 of FIG. 1). Further, the processor 220 may store the received first image in the memory 230 in order to edit the received first image.

According to one or more embodiments, the image generation model 310 may generate a new image, based on the existing image, by using at least one artificial intelligence (AI) model. For example, the image generation model 310 may be stored in the memory 230 or the external server.

According to one or more embodiments, the image generation model 310 may include at least one artificial intelligence (AI) model. For example, at least one artificial intelligence model may include a generative artificial intelligence (AI) model. For example, by using the existing content such as text, audio, and/or images, the generative artificial intelligence model may newly generate content similar to the corresponding content. For example, the generative artificial intelligence model may learn a pattern of content and generate new content, based on an inference result. For example, the image generation model 202 may perform at least one of an in-painting operation or an out-painting operation for the first image and generate (acquire or output) the second image.

According to one or more embodiments, the in-painting operation may indicate an operation (or a function) of generating (or painting) a part deleted from the image to match the surroundings by using an AI model. Alternatively, the in-painting operation may indicate an operation of generating (or painting) a part hidden by some objects in the image to match the surroundings by using an AI model.

According to one or more embodiments, the out-painting operation may indicate an operation (or a function) of expanding an outer area of the image by using an AI model and generating (or painting) the expanded part to match the existing image.

According to one or more embodiments, at least some of the operations in which the electronic device 201 (or the processor 220) generates or acquires the second image, based on the first image, may be performed using the image generation model 310 (or the generative AI model).

According to one or more embodiments, the processor 220 may display the first image stored in the memory 230 on the display 260 (for example, the display module 160 of FIG. 1). For example, the first image may include at least one object. For example, at least one object may include a person (for example, a person's face), an animal, an object, a background, etc.

According to one or more embodiments, the processor 220 may identify a first object corresponding to a target to be edited among at least one object included in the first image. For example, the first object may include a person's face included in the first image.

According to one or more embodiments, the processor 220 may detect a user's face included in the first image as the first object, based on a face detection function being performed for the first image.

According to one or more embodiments, the processor 220 may identify the first object, based on a user input. For example, the processor 220 may identify the user's face as the first object, based on a user input (for example, a touch input) for the user's face included in the first image.

According to one or more embodiments, the processor 220 may display an image obtained by enlarging the first image, based on a part corresponding to the first object, according to the operation of identifying the first object. For example, instead of the first image, the processor 220 may display the image obtained by enlarging the first image on the display 260. For example, when the first object is a person's face included in the first image, the processor 220 may enlarge the first image, based on the corresponding person's face.

According to one or more embodiments, the processor 220 may identify a command for editing the first image. For example, when a predetermined user input (for example, a touch input, a gesture input, or a voice input) is identified, the processor 220 may identify the command for editing the first image. For example, the processor 220 may display a graphic object for editing the first image on the display 260 by using the image (hereinafter, referred to as a preview image) captured through the camera 210 (for example, the camera module 180 of FIG. 1). For example, the camera 210 may be a camera arranged on the front surface or the rear surface of the electronic device 201. The processor 220 may identify the command for editing the first image, based on a user input for the graphic object. For example, the processor 220 may display the preview image corresponding to the image captured through the camera 210 on the display 260, based on the user input for the graphic object. For example, the camera 210 may include a camera (for example, a front camera) for capturing a user.

According to one or more embodiments, the processor 220 may identify capturing information for the first image. For example, the processor 220 may identify metadata (or metadata information) of the first image or analyzing the first image to identify capturing information for the first image. For example, the capturing information may include a focal distance at which the first image is captured, brightness, white balance, and/or a shutter speed. The metadata (or metadata information) may include location information indicating the location of the object included in the first image.

According to one or more embodiments, the processor 220 may generate or acquire a second image, based on the metadata (or capturing information) on the first image and a second object included in the preview image.

According to one or more embodiments, the processor 220 may control the camera 210 to acquire the preview image in real time, based on the metadata (or capturing image) on the first image. For example, the processor 220 may control a focal distance of the camera 210 according to the focal distance at which the first image is captured. The processor 220 may acquire the preview image after controlling the focal distance of the camera 210, based on the focal distance of the first image.

According to one or more embodiments, the processor 220 may display the preview image captured or acquired in real time through the camera 210 on the display 260 along with the first image. For example, the processor 220 may display the preview image through a pop-up window. For example, the processor 220 may display the preview image on the first image so as not to overlap the first object included in the first image.

According to one or more embodiments, the processor 220 may analyze the first image (or the original image), based on face information preferred by the user or a learning result of the existing capturing state of the user (for example, a capturing angle, a capturing composition, a brightness configuration, a white balance configuration, and/or a sensitivity configuration). The processor 220 may analyze (for example, a mouth shape) an area that the user is likely to want to edit in the first image (or the original image) and recommend a capturing guide (for example, a facial expression image preferred by the user) to the user or provide an object (or a user interface (UI)) indicating a recommended facial expression shape (or a guide facial expression shape) to the preview image. When providing the capturing guide, the processor 220 may provide a guide UI that induces an area (for example, face), to be edited in the preview image, to be centered. For example, when the guide UI that induces the user's face to be centered is displayed and the user's face is located in an area corresponding to the corresponding guide UI, the processor 220 may provide a highlight effect to the user's face (or the corresponding guide UI). Further, when the user's face is located in the area corresponding to the corresponding guide UI, the processor 220 may transmit a control signal that causes a notification (for example, vibration) to be generated by an external device (for example, a smart watch, a smart ring, a video see-through (VST) device, and/or wireless earphones) linked to the electronic device 201 to the corresponding external device.

According to one or more embodiments, the processor 220 may identify the first object included in the first image and a second object corresponding to the first object included in the preview image. For example, the preview image may include at least one image. For example, the preview image may include the second object corresponding to the first object included in the first image. For example, when the first object included in the first image is the user's face, the preview image may include the same user's face. The processor 220 may identify the second object (for example, the corresponding user's face) corresponding to the first object (for example, the user's face) in the preview image.

According to one or more embodiments, the processor 220 may identify, as the first object, a face corresponding to a first face included in the preview image among at least one face included in the first image, based on the performance of a face recognition function for the preview image.

According to one or more embodiments, the processor 220 may input the first image and information about the second object (for example, feature information of the second object) into a generative AI model stored in the memory 230 to acquire a second image in which at least a portion of the first object is transformed to at least a portion of the second object. For example, the processor 220 may acquire the second image in which at least a portion of the user's face in the first image is transformed to at least a portion of the user's face in the preview image. For example, in the second image, the user's face may have at least one of a facial expression, a position, an angle, a brightness, or a hairstyle that is changed compared to the user's face in the first image.

According to one or more embodiments, the processor 220 may transmit the first image and the information about the second object (for example, feature information of the second object) to an external server to input the first image and the information about the second object (for example, feature information of the second object) into a generative AI model stored in the external server. The processor 220 may receive or acquire the second image from the external server.

According to one or more embodiments, the processor 220 may display the second image on the display. For example, the processor 220 may display the preview image along with the second image. The processor 220 may display the preview image captured in real time using the camera 210. For example, through the preview image, the processor 220 may reflect the second object changed in real time in the preview image or display the same through the preview image. The processor 220 may reflect, in the second image, at least a portion of the second object changed in real time in the preview image.

According to one or more embodiments, in response to a user input for the preview image displayed along with the second image, the processor 220 may acquire or store an image file corresponding to the second image. For example, the user input for the preview image may be an input indicating completion of editing of the first image.

According to one or more embodiments, the processor 220 may modify (or change) the first image without the use of an image generation model (for example, the image generation model 310 of FIG. 3). For example, the processor 220 may acquire or generate an image (for example, a modified first image) in which at least the portion of the first object included in the first image is modified to or replaced with at least the portion of the second object included in the image (for example, the preview image) acquired through the camera 210 without the use of the image generation model (for example, the image generation model 310 of FIG. 3). For example, the processor 220 may generate and display the modified first image in which the first object of the first image (or an area corresponding to the first object) (for example, the face or a face area) is replaced with the second object (or an area corresponding to the second object) (for example, the face or a face area) included in the preview image. The processor 220 may display the modified first image with the preview image. The modified first image may include a result (for example, an image) in which the face is schematically modified, changed, or replaced. For example, the processor 220 may generate or acquire the modified first image by changing the first object (or the area corresponding to the first object) of the first image to at least the portion of the second object (or the area corresponding to the second object) included in the preview image through a known image editing algorithm. Thereafter, in response to the user input indicating completion of editing of the first image, the processor 220 may acquire and/or store the second image generated by editing the first image through the generative AI model. Further, the processor 220 may acquire and/or store an image file corresponding to the second image. For example, a method of generating the second image obtained by editing the first image through the generative AI model may be based on the above-described method.

FIG. 3 is a block diagram schematically illustrating an image generation model according to one or more embodiments.

Referring to FIG. 3, according to one or more embodiments, the image generation model 310 may include a generative AI model 320 and a feature extraction model 330. For example, the generative AI model 320 and the feature extraction model 330 may be implemented as AI models.

According to one or more embodiments, the feature extraction model 330 may extract or acquire feature information of the second object included in the preview image from the preview image. For example, the feature information may include information for replacing at least a portion of the first object of the first image with at least a portion of the second object. For example, the feature information may include information indicating features of the second object included in the preview image. For example, the feature information may include information about at least one of a color, a form, a shape an angle, a background, or a composition of the second object. For example, when the second object is the user's face, the feature information may include information about face features (for example, a size, a shape, an angle, a position, a facial expression, a makeup style, a color, and/or a brightness), features of ears, eyes, mouth, and nose included in the face (for example, locations, sizes, shapes, colors, and/or angles of the ears, eyes, mouth, and nose), and/or a hairstyle.

According to one or more embodiments, the feature extraction model 330 may acquire prompt information (for example, text prompt), based on the feature information. For example, the feature extraction model 330 may generate at least two text prompts for the features of the second object.

The feature extraction model 330 may provide the feature information to the generative AI model. Further, the feature extraction model 330 may provide prompt information along with the feature information to the generative AI model 320. Alternatively, the feature extraction model 330 may provide the generative AI model 320 with the prompt information as the feature information.

According to one or more embodiments, the generative AI model 320 may generate (for example, reproduce, paint, or add) the second image by using the first image and the feature information of the second object. Alternatively, the generative AI model 320 may generate, output, or acquire the second image by using prompt information (for example, text prompt) that commands to generate the first image and the second image. Alternatively, the second image may be generated using the first image, the feature information of the second object, and the prompt information. For example, the text prompt (or a text command) may include a command in a text form that can be recognized by the generative AI model 320. For example, the text prompt may include a command for generating the second image by the generative AI model 320. For example, the second image may be an image in which at least a portion of the first object of the first image is transformed to or replaced with at least a portion of the second object. For example, the electronic device 201 may generate the second image, based on at least two text prompts and the second object by using the generative AI model 320. For example, the generative AI model 320 may perform a painting operation for the first image while transforming or replacing at least the portion of the first object of the first image to or with at least the portion of the second object. For example, when generating the second image, the processor 220 may perform an in-painting operation for generating a first part of the first image. For example, the first part may be a part (for example, a part to be additionally filled in while a segment corresponding to the at least the portion of the first object is replaced with at least the portion of the second object) removed when at least the portion of the first object is replaced with at least the portion of the second object. Further, the processor 220 may perform an out-painting operation for generating a second part of the first image by using the image generation model 202. For example, the second part may be a newly added part (for example, a part, a shadow, or shading to be added according to a lighting or an angle) when at least the portion of the first object is transformed to or replaced with at least the portion of the second object.

Through the above-described method, the electronic device 201 according to one or more embodiments may easily edit the first image by using an image captured through the camera 210. For example, the electronic device 201 may easily and effectively edit the first image including the user's face to be a user's face captured on the spot through the camera 210. Further, the electronic device 201 may acquire an image in which a specific object (for example, the user's face) is naturally transformed to an object captured through the camera 210 by using the generative AI model 320.

At least some of the operations of the electronic device 201 described below may be performed by the processor 220 or the image generation model 310. However, for convenience of description, the following operations will be described as being performed by the electronic device 201.

Figure 4A:
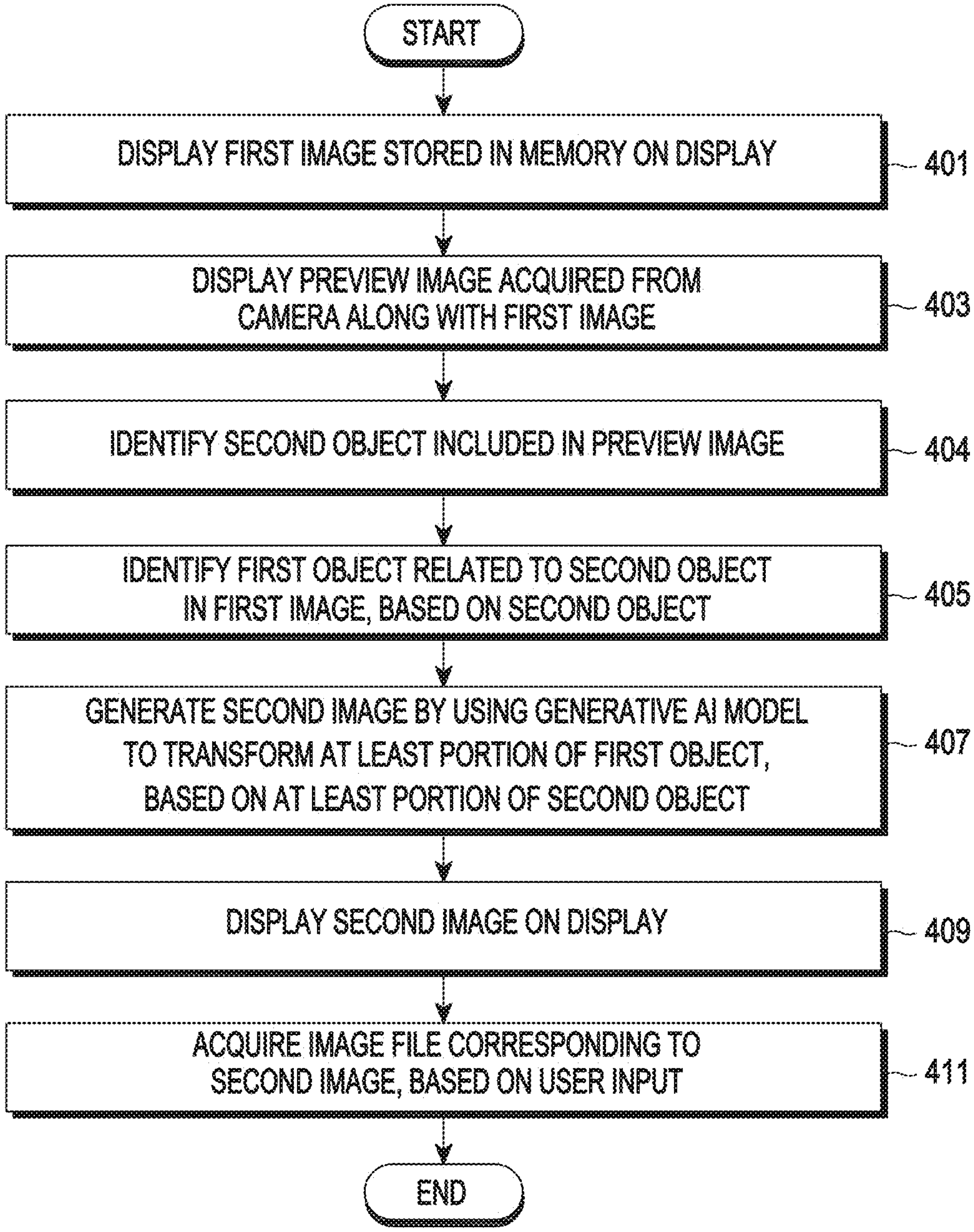
FIG. 4A is a flowchart illustrating a method by which an electronic device acquires a second image, based on a first image and a preview image being displayed according to one or more embodiments.

FIG. 4A is a flowchart illustrating a method by which an electronic device acquires a second image, based on a first image and a preview image being displayed according to one or more embodiments.

Referring to FIG. 4A, according to one or more embodiments, in operation 401, the electronic device 201 may display a first image stored in memory (for example, the memory 230 of FIG. 2) on a display (for example, the display 260 of FIG. 2). The electronic device 201 may perform an operation for editing the first image, based on a predetermined user input (for example, a touch input for a graphic object to edit the first image). For example, the first image may include a first object (or a first specific area). For example, the first object may include a user's face included in the first image. For example, the first specific area may include an area corresponding to the first object (for example, the user's face) included in the first image. However, when the first object is not distinguished (or identified) in the first image, the first specific area may not correspond to the first object.

According to one or more embodiments, in operation 403, the electronic device 201 may display a preview image acquired from a camera (for example, the camera 210 of FIG. 2) along with the first image. For example, the electronic device 201 may display the preview image captured through the camera 210 along (or simultaneously) with the first image on the display 260, based on a predetermined user input. For example, when the electronic device 201 includes a foldable display or a rollable display, the electronic device 201 may split an unfolded screen or an expanded screen into areas in which the first image and the preview image are displayed so that the first image and the preview do not overlap each other. For example, the electronic device 201 may display the first image in a first area of display and the preview image in a second area of the display so that the first image and the preview image do not overlap each other.

According to one or more embodiments, in operation 404, the electronic device 201 may identify a second object (or a second specific area) included in the preview image. The second object may include a user's (for example, the same user's) face included in the second image. For example, the second specific area may include an area corresponding to the second object (for example, the same user's face) included in the preview image. However, when the second object is not distinguished in the preview image, the second specific area may not correspond to the second object.

According to one or more embodiments, in operation 405, the electronic device 201 may identify the first object (or the first specific area) related to the second object (or the second specific area) in the first image, based on the second object. For example, the electronic device 201 may identify the first object (or the first specific area) corresponding to the same as or similar to a face corresponding to the second object (or the second specific area) in the first image. For example, the second object may include the user's face included in the preview image. For example, the second specific area may include an area corresponding to the second object (for the user's face) included in the preview image. However, when the second object is not distinguished (or identified) in the preview image, the second specific area may not correspond to the second object.

According to one or more embodiments, the order of operation 405 may be partially changed. For example, the operation of identifying the first object (or the first specific area) may be performed before the preview image is displayed or before the second object (or the second specific area) included in the preview image is identified. For example, when identifying the first object (or the first specific area), the electronic device 201 may not be based on the second object (or the second specific area) included in the preview image. For example, the electronic device 201 may identify, in the first image, the first object (or the first specific area) corresponding to a target to be edited, based on a user input.

According to one or more embodiments, in operation 407, the electronic device 201 may generate a second image by using a generative AI model to transform at least a portion of the first object (or the first specific area) based on at least a portion of the second object (or the second specific area). For example, the electronic device 201 may generate the second image by editing the first image by using the generative AI model. The electronic device 201 may acquire the second image in which at least the portion of the first object is transformed to at least the portion of the second object by inputting the first image and information about the second object (for example, feature information of the user's face included in the preview image) into the generative AI model (for example, the generative AI model 320 of FIG. 3). For example, the generative AI model 320 may be stored in the memory 230 or an external server. For example, when the generative AI model 320 is stored in the external server, the electronic device 201 may transmit the first image and the information about the second object to the external server and receive the second image from the external server. For example, the electronic device 201 may transmit information including at least a portion of the first image and the second object to the external server to generate the second image as at least a part of the operation for generating the second image by using the generative AI model stored in the external server.

According to one or more embodiments, in operation 409, the electronic device 201 may display the second image on the display 260. For example, the second image may be an image generated or acquired through editing of the first image using the generative AI model. For example, the electronic device 201 may display the preview image on the second image. For example, the electronic device 201 may reflect in real time a change in the second object (for example, the user's face) (or the second specific area) included in the preview image in the second image.

According to one or more embodiments, in operation 411, the electronic device 201 may acquire (or store) an image file corresponding to the second image, based on a user input. For example, the electronic device 201 may acquire an image file corresponding to the second image at a corresponding time point in response to a user input (for example, a touch input) for an object (for example, an object for completing editing of the first image) included in the preview image. For example, the image file may include an image in which at least a portion of the first object (or the first specific area) included in the first image acquired at a time point at which a user input is identified is transformed to at least a portion of the second object (or the second specific area) included in the preview image.

Hereinafter, one or more embodiments of transforming at least a portion of the first object to the second object included in the preview image will be described. However, embodiments of the disclosure may also be applied to one or more embodiments of transforming at least a portion of the first specific area instead of the first object to at least a portion of the second specific area included in the preview image.

Figure 4B:
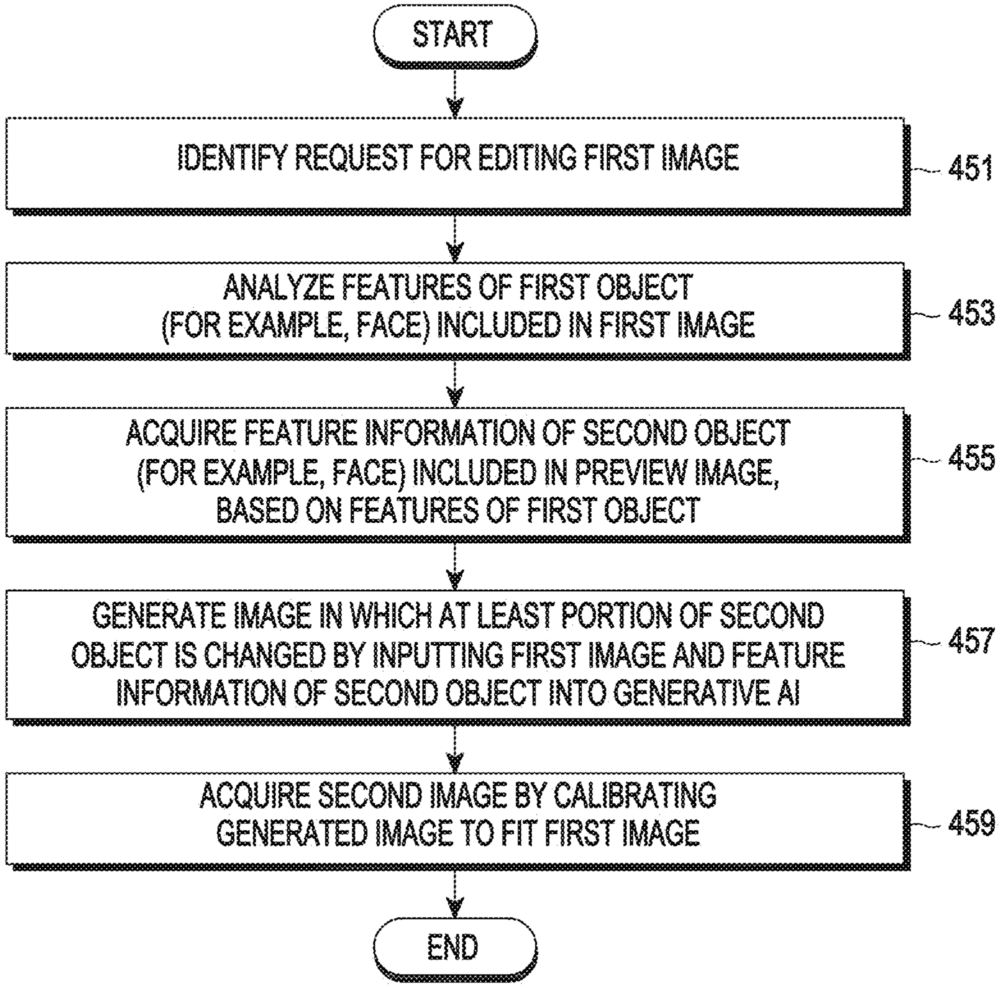
FIG. 4B is a flowchart illustrating the method by which an electronic device acquires a second image by using an image generation model according to one or more embodiments.

FIG. 4B is a flowchart illustrating the method by which an electronic device acquires a second image by using an image generation model according to one or more embodiments.

Referring to FIG. 4B, according to one or more embodiments, the electronic device (for example, the electronic device 201 of FIG. 2) identify a request for editing the first image in operation 451. That is, the electronic device (201) may determine the first image that is a target to be edited. For example, the electronic device 201 may determine or identify the first image as an image to be edited, based on a predetermined user input (for example, a touch input for a graphic object for editing the first image).

According to one or more embodiments, in operation 453, the electronic device 201 may analyze features of the first object included the first image (for example, the user's face included in the first image). For example, the electronic device 201 may analyze features of the face included in the first image (for example, the face size, the face shape, features of the face skin, features of ears, eyes, mouth, and nose, a makeup styles, and/or features of a hairstyle) by using a feature extraction model (for example, the feature extraction model 330 of FIG. 3).

According to one or more embodiments, in operation 455, the electronic device 201 may acquire feature information of the second object included in the preview image (for example, the user's face included in the preview image) acquired through a camera (for example, the camera 210 of FIG. 2), based on the features of the first object. The electronic device 201 may identify the second object corresponding to the first object included in the preview image, based on the features of the first object. The electronic device 201 may extract, acquire, or identify feature information of the second object by using the feature extraction model (for example, the feature extraction model 330 of FIG. 3). For example, the feature information may include features of the face included in the preview image (for example, a size, a shape, an angle, a position, a facial expression, a makeup style, a color, and/or a brightness), features of ears, eyes, mouth, and nose included in the face (for example, locations, sizes, shapes, colors, and/or angles of the ears, eyes, mouth, and nose), and/or a hairstyle.

According to one or more embodiments, in operation 457, the electronic device 201 may generate or acquire an image in which at least a portion of the second object is transformed by inputting the first image and feature information of the second object into the generative AI model (for example, the generative AI model 320 of FIG. 3).

According to one or more embodiments, in operation 459, the electronic device 201 may acquire the second image by calibrating the generated image to fit the first image. For example, the operation of calibrating the generated image in accordance with the first image may be performed by the generative AI model. At this time, the electronic device 201 may acquire the second image, based on a user preference (for example, an angle, a composition, a brightness, and/or a configuration value designated by the user stored in the electronic device 201). Alternatively, the electronic device 201 may additionally calibrate, by a user input, the second image acquired by the generative AI model.

According to one or more embodiments, after a face shape that the user desires is reflected in the first image (or the original image) by using the preview image, the electronic device 201 may display an object (for example, a button type object) that commands to complete (or end) editing of the first image to the acquired second image. The electronic device 201 may complete (or end) the editing of the first image, based on a user input for the corresponding object. The electronic device 201 may additionally store frames (for example, the predetermined number of frames acquired through the camera 210) before and/or after a corresponding time point at which the user input for the corresponding object is identified. For example, in the state in which the image acquired through the camera 210 is reflected in real time in the first image (or the original image), the face shape that the user desires may not be reflected due to hand shaking of the user in the second image generated or stored at the time point at which the user makes the user input (for example, a touch input) for the corresponding object. Alternatively, a face shapes that the user desires may not be reflected like a change in locations of pupils by an instantaneous change in user's eyes in the second image. Accordingly, the electronic device 201 may additionally acquire and store frames before and/or after a time point at which the user input for the corresponding object is made (for example, the predetermined number (for example, three) of frames acquired before and after the corresponding time point or frames acquired before and after a predetermined time (for example, 2 seconds) from the corresponding time point. The electronic device 201 may provide a UI that allows the user to select a final result (for example, an image finally selected from among the additionally acquired frames) related to the second image by providing the additionally acquired frames along with the second image. Alternatively, the electronic device 201 may provide a UI that recommends the selected image as a recommended image according to a predetermined condition (for example, an image that matches an optimal condition) among the second image and the additionally acquired frames. For example, when selecting the recommended image, the electronic device 201 may consider a result obtained by learning facial expressions preferred by the user or reflect a reference (for example, a priority configured by the user) preconfigured in the electronic device 201. For example, the electronic device 201 may generate or acquire recommended images by inputting the first image (or the original image) and images (or frames) acquired in real time through the camera 210 into the generative AI model. For example, the electronic device 201 may display the recommended images in the form of thumbnails. The recommended images displayed in the form of thumbnails may be generated at low resolution, and thus a time required for generating the recommended images by the generative AI model may be reduced. The electronic device 201 may provide a UI that allows the user to select one of the recommended images displayed in the form of thumbnails. When the user selects one of the recommended images, the electronic device 201 may convert the recommended image selected by the user into a high-resolution image corresponding to the first image (or the original image) or regenerate the same.

According to one or more embodiments, the electronic device 201 may identify or determine whether the finally generated second image includes a shape or a facial expression (for example, a face shape or a facial expression) that the user does not prefer, based on a pre-learned capturing state of the user. For example, when it is determined that the shape or the facial expression that the user does not prefer is included in the finally generated second image, the electronic device 201 may provide a UI that induces the user to perform recapturing. For example, the corresponding UI may provide a message indicating that the shape or the facial expression that is not preferred by the user is included in the second image and/or a message that induces recapturing. Further, the electronic device 201 may generate the facial expression of the shape preferred by the user through a guide UI and provide the same to the preview image. When the user is wearing a wearable electronic device (for example, a smart watch, a smart ring, a VST device, and/or wireless earphones) linked to the electronic device 201, the electronic device 201 may transmit, to the corresponding wearable electronic device, a control signal for providing a feedback or a capturing guide through the wearable electronic device. The wearable electronic device may provide the feedback or the capturing guide, based on the control signal.

According to one or more embodiments, when generating the second image, the electronic device 201 may reflect a lighting characteristic of the first image (or the original image). For example, when a position of the user's head acquired through the preview image is different from a position of the user's head included in the first image, the lighting characteristic of the first image (or the original image) may not be reflected and thus an awkward result may be generated. For example, when the face in the original image is dark because it is in shadow and the face in the preview image is bright because it is illuminated, an awkward result may be generated if the lighting characteristic of the first image is not reflected in the second image. When generating the second image, the electronic device 201 may identify or extract the lighting characteristic of the first image (or the original image) and provide a function of applying the lighting characteristic of the first image in a head area or areas around the head area.

Through the above-described method, the electronic device 201 according to one or more embodiments may easily edit the first image to be edited, by using an image captured through the camera 210. For example, the electronic device 201 may easily and effectively edit the first image including the user's face to be a user's face captured on the spot through the camera 210. Further, the electronic device 201 may acquire an image in which a specific object (for example, the user' face) is naturally transformed to an object captured through the camera 210 by using the generative AI model 320.

Figure 4C:
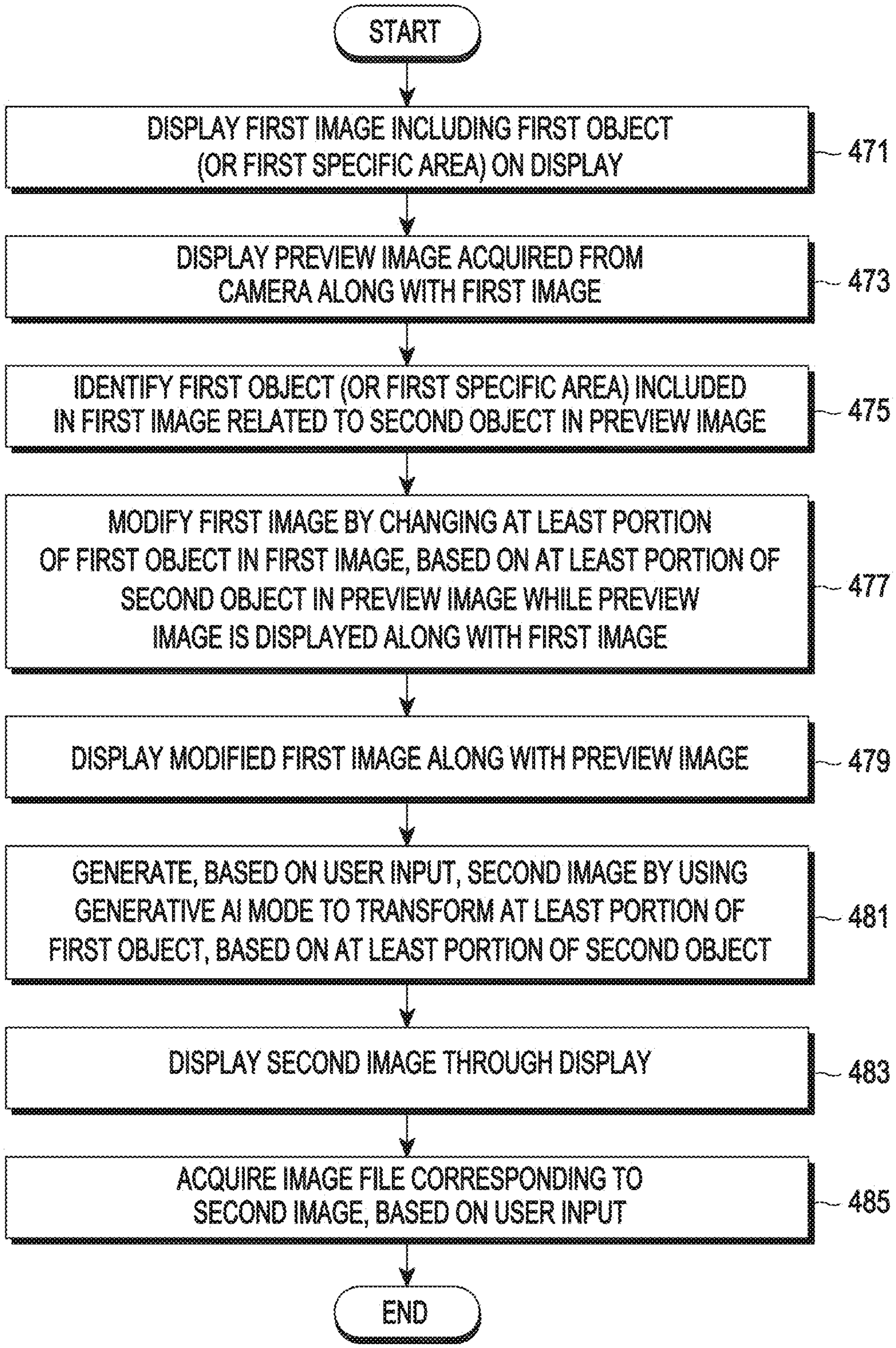
FIG. 4C is a flowchart illustrating a method by which an electronic device edits a first image and acquires a second image according to one or more embodiments.

FIG. 4C is a flowchart illustrating a method by which an electronic device edits a first image and acquires a second image according to one or more embodiments.

Referring to FIG. 4A, according to one or more embodiments, in operation 471, the electronic device 201 may display the first image stored in memory (for example, the memory 230 of FIG. 2) on a display (for example, the display 260 of FIG. 2). The electronic device 201 may perform an operation for editing the first image, based on a predetermined user input (for example, a touch input for a graphic object to edit the first image). For example, the first image may include a first object (or a first specific area). For example, the first object may include a user's face included in the first image. For example, the first specific area may include an area corresponding to the first object (for example, the user's face) included in the first image. However, when the first object is not distinguished (or identified) in the first image, the first specific area may not correspond to the first object.

According to one or more embodiments, in operation 473, the electronic device 201 may display a preview image acquired from a camera (for example, the camera 210 of FIG. 2) along with the first image. For example, the electronic device 201 may display the preview image (or a live preview image) captured through the camera 210 along with (or simultaneously with) the first image on the display 260, based on a predetermined user input.

According to one or more embodiments, in operation 475, the electronic device 201 may identify the first object in the first image (or the first specific area) related to the second object (or the second specific area), based on the second object. For example, the electronic device 201 may identify the first object (or the first specific area) corresponding to the same as or similar to a face corresponding to the second object (or the second specific area), in the first image. For example, the second object may include the user's face included in the preview image. For example, the second specific area may include an area corresponding to the second object (for example, the user's face) included in the preview image. However, when the second object is not distinguished (or identified) in the preview image, the second specific area may not correspond to the second object.

According to one or more embodiments, the order of operation 475 may be partially changed. For example, the operation of identifying the first object (or the first specific area) may be performed before the preview image is displayed or before the second object (or the second specific area) included in the preview image is identified. For example, when identifying the first object (or the first specific area), the electronic device 201 may not be based on the second object (or the second specific area) included in the preview image. For example, the electronic device 201 may identify, in the first image, the first object (or the first specific area) corresponding to a target to be edited, based on a user input.

According to one or more embodiments, in operation 477, the electronic device 201 may modify the first image by changing at least a portion of the first object (or the first specific area) of the first image, based on at least a portion of the second object (or the second specific area) of the preview image while displaying the preview image (or the live preview image) along with the first image. For example, the modified first image may be an image in which the user's face included in the first image is replaced with (or changed to) the user's face included in the preview image. For example, the electronic device 201 may acquire the first image that is modified in real time without the use of the generative AI model.

In operation 479, the electronic device 201 may display (e.g., in real time) the modified first image along with the preview image. For example, the modified first image may include an image in which the face in the preview image is schematically reflected in the first image. The electronic device 201 may display the first image that is modified more rapidly than the case where the generative AI model is used.

According to one or more embodiments, in operation 481, based on a user input (for example, a user input for completing editing of the first image), the electronic device 201 may generate the second image obtained by editing the first image through the generative AI model to transform at least the portion of the first object, based on at least the portion of the second object. For example, operation 481 may be performed to be the same or similar to operation 407 of FIG. 4A.

According to one or more embodiments, in operation 483, the electronic device 201 may display the second image on the display 260. For example, the second image may be an image generated or acquired through editing of the first image using the generative AI model. For example, the electronic device 201 may display the preview image on the second image. The modified first image may be replaced with the second image. For example, the electronic device 201 may reflect in real time a change in the second object (for example, the user's face) (or the second specific area) included in the preview image in the second image. According to one or more embodiments, operation 483 may be omitted. For example, after operation 481, operation 485 may be performed.

According to one or more embodiments, in operation 485, the electronic device 201 may acquire (or store) an image file corresponding to the second image, based on a user input. For example, the electronic device 201 may acquire an image file corresponding to the second image at a corresponding time point in response to a user input (for example, a touch input) for an object (for example, an object for completing editing of the first image) included in the preview image. For example, the image file may include an image in which at least a portion of the first object (or the first specific area) included in the first image acquired at a time point at which a user input is identified is transformed to at least a portion of the second object (or the second specific area) included in the preview image.

The embodiment of FIG. 4C may be equally or similarly applied to a method of generating the second image described below. For example, an operation of displaying the second image in real time described below may be replaced with an operation of displaying the modified first image.

Figure 5A:
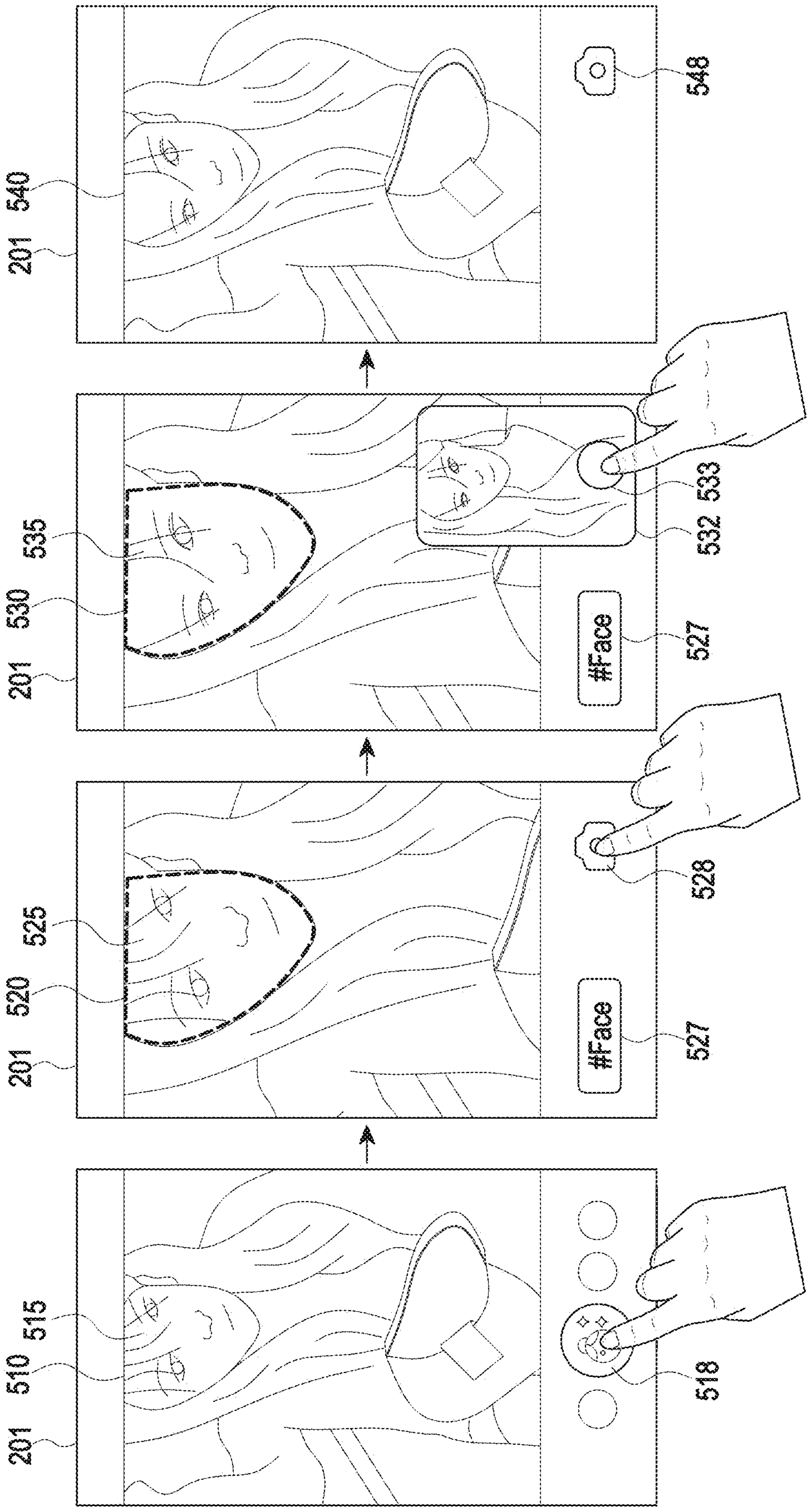
FIGS. 5A, 5B, and 5C are diagrams illustrating a method by which an electronic device acquires a second image, based on a first image and a preview image being displayed according to one or more embodiments.
Figure 5B:
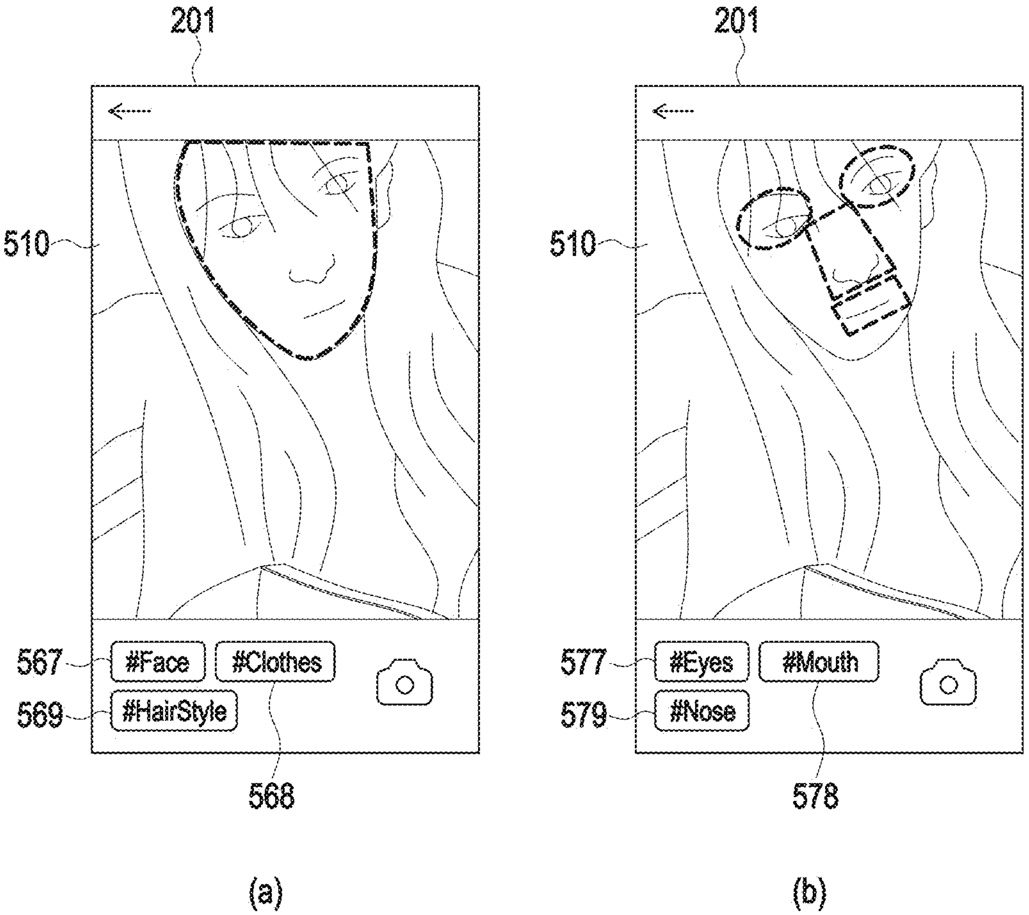
Figure 5C:
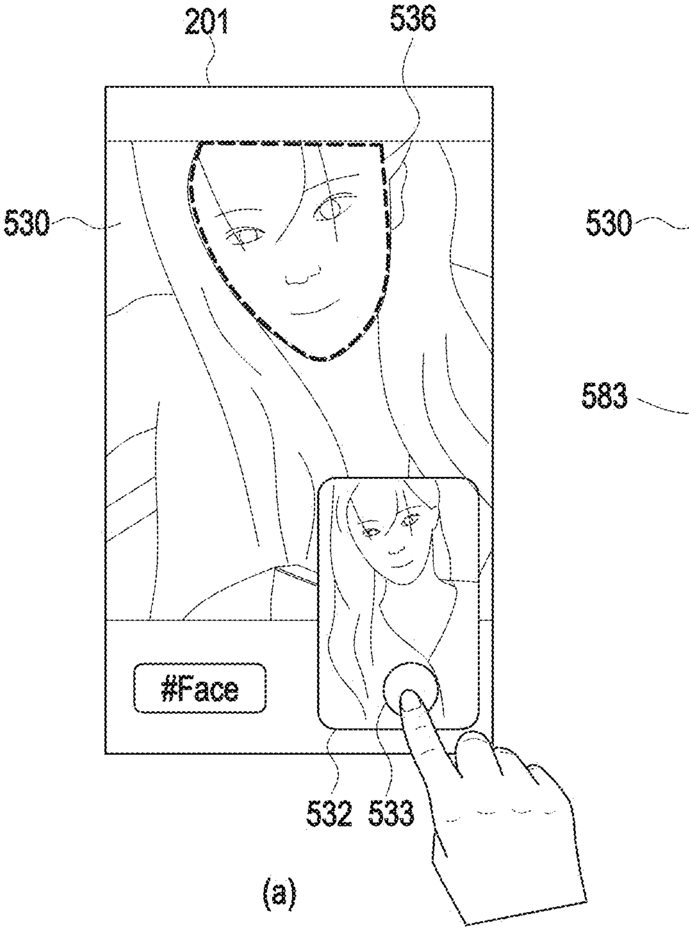

FIGS. 5A, 5B, and 5C are diagrams illustrating a method by which an electronic device acquires a second image, based on a first image and a preview image being displayed according to one or more embodiments.

Referring FIG. 5A, according to one or more embodiments, the electronic device 201 may display a first image 510 on a display (for example, the display 260 of FIG. 2). The electronic device 201 may perform an operation for editing the first image, based on a user input (for example, a touch input) on a graphic object 518 for editing the first image 510.

According to one or more embodiments, the electronic device 201 may identify a first object 515 (for example, a user's face) included in the first image 510. The electronic device 201 may display information 527 (for example, Face) on the identified first object. Based on the first object 515 being identified in the first image 510, the electronic device 201 may display an image 520 obtained by enlarging the first image 510, based on a part 525 corresponding to the first object 515, instead of the first image. According to one or more embodiments, the operation of displaying the enlarged image 520 instead of the first image may be omitted. For example, the electronic device 201 may identify the first object, based on a user input for the first object 515 (for example, a touch input for the first object 515) included in the first image 510. Alternatively, when a user input on a graphic object 518 is identified, the electronic device 201 may identify the first object 515 included in the first image 510. The electronic device 201 may identify the first object 515 included in the first image 510, based on an image indicating the user's face pre-stored in the electronic device 201.

Referring to FIG. 5B, according to one or more embodiments, the electronic device 201 may identify or select, as the first object, various objects other than the user's face. According to one or more embodiments, as illustrated in part (a) of FIG. 5B, the electronic device 201 may identify or select the user's clothes and/or hairstyle as well as the face included in the first image. The electronic device 201 may display information 567, 568, and 569 indicating identified objects. The electronic device 201 may determine, as an object to be edited, an object identified by a user input in the information 567, 568, and 569 indicating the objects. For example, the electronic device 201 may determine, as the user's clothes, the object to be edited, based on a user input for the information 568 indicating the user's clothes. According to one or more embodiments, as illustrated in part (b) of FIG. 5B, the electronic device 201 may identify or select detailed objects (for example, eyes, nose, and/or mouth) included in the face in the first image. The electronic device 201 may display information 577, 578, and 579 indicating the detailed objects included in the face. The electronic device 201 may determine, as an object to be edited, an object identified by a user input in the information 567, 568, and 569 indicating the objects. For example, the electronic device 201 may determine the object to be edited as the user's mouth, based on a user input for the information 579 indicating the user's mouth.

An area (for example, a dotted line area) for distinguishing the object 515 or 525 identified by the electronic device 201 is for convenience of description and thus may not be displayed on the display 260. However, according to one or more embodiments, the electronic device 201 may display the area (for example, the dotted line area) for distinguishing the identified first object 515 or 525.

Referring to FIG. 5A, according to one or more embodiments, based on a user input for a graphic object 528, the electronic device 201 may display a preview image 532 acquired (or captured) through a camera (for example, the camera 210 of FIG. 2) along with the first image 510 or an image 520 obtained by enlarging the first image on the display 260. For example, the electronic device 201 may display a preview image 532 on the first image 510 (or the image 520 obtained by enlarging the first image). For example, the electronic device 201 may display the preview image 532 not to overlap the first object 515 or 525.

According to one or more embodiments, the electronic device 201 may identify a second object (for example, the user's face) corresponding to the first object included in the preview image 532. The electronic device 201 may acquire and display a second image 530 in which at least a portion of the first object is transformed to at least a portion of the second object by using a generative AI model (for example, the generative AI model 320 of FIG. 3). The electronic device 201 may display the preview image 523 on the second image 530. For example, the electronic device 201 may reflect in real time a change in the second object (for example, the user's face) included in the preview image 532 in the second image 530. That is, the face 535 corresponding to the user's face included in the preview image 532 may be reflected in the second image 530 in real time.

According to one or more embodiments, the electronic device 201 may acquire an image (or an image file) 540 corresponding to the second image, based on a user input for the object 533 included in the preview image 532. The electronic device 201 may store the corresponding image. Alternatively, the electronic device 201 may additionally edit the corresponding image. For example, the electronic device 201 may additionally edit the corresponding image, based on a user input for a graphic object 548.

According to one or more embodiments, referring to FIG. 5C, the electronic device 201 may display the preview image in various forms. For example, the electronic device 201 may display the preview image 532 through a pop-up window as illustrated in part (a) of FIG. 5C. Alternatively, the electronic device 201 may display an at least partially transparent window 582 instead of the preview image 532, as illustrated in part (b) of FIG. 5C. The transparent window 582 may be displayed to overlap the first object of the first image (the image obtained by enlarging the first image). Further, the transparent window 582 may be displayed such that at least the portion of the second object included in the preview image is reflected in the first image (or the image obtained by enlarging the first image). The electronic device 201 may acquire an image (or an image file) 540 corresponding to the second image, based on a user input for an object 583 included in the transparent window 582. For example, part (a) of FIG. 5C and part (b) of FIG. 5C are screens corresponding to respective modes and may be switched by a user intent (or a user input). Further, the electronic device 201 may display, by default, a screen corresponding to a mode selected by the user among the screen of part (a) of FIG. 5C and the screen of part (b) of FIG. 5C.

Figure 6:
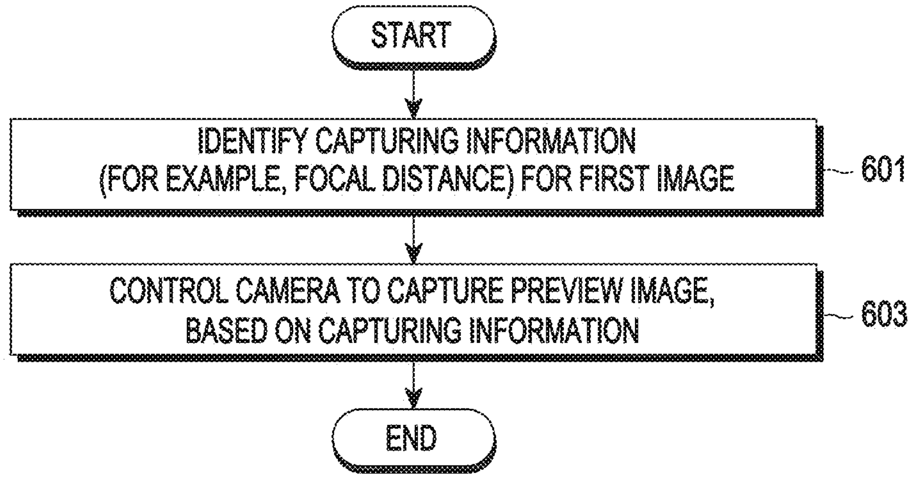
FIG. 6 is a flowchart illustrating a method by which an electronic device captures a preview image, based on capturing information of a first image according to one or more embodiments.

FIG. 6 is a flowchart illustrating a method by which an electronic device captures a preview image, based on capturing information of a first image according to one or more embodiments.

Referring to FIG. 6, according to one or more embodiments, in operation 601, an electronic device (for example, the electronic device 201 of FIG. 2) may identify capturing information of a first image (for example, a focal distance at which the first image is captured). For example, when the first image is displayed on a display (for example, the display 260 of FIG. 2), the electronic device 201 may identify the capturing information of the first image. Alternatively, when an editing operation of the first image is performed, the electronic device 201 may identify the capturing information of the first image. For example, the electronic device 201 may identify the capturing information of the first image, based on metadata of the first image. Further, the electronic device 201 may identify the capturing information of the first image by analyzing the first image. For example, when analyzing the first image, the electronic device 201 may use an AI model (for example, an AI model stored in the memory 230 or stored in an external server). The capturing information may include focal distance information, shutter speed information, or location information of the first object.

According to one or more embodiments, in operation 603, the electronic device 201 may control a camera (for example, the camera 210 of FIG. 2) to capture a preview image, based on the capturing information of the first image. For example, the electronic device 201 may control the camera 210 to capture the preview image, based on the focal distance at which the first image is captured. The electronic device 201 may control the camera 210 in hardware or control the camera 210 by a software algorithm. Alternatively, the electronic device 201 may generate a second image by using information about a characteristic of a second object displayed in the preview image and the capturing information of the first image without the control of the camera 210.

Through the above-described method, the electronic device 201 may minimize distortion of the image when the second object acquired through the preview image is reflected in the first image.

Figure 7:
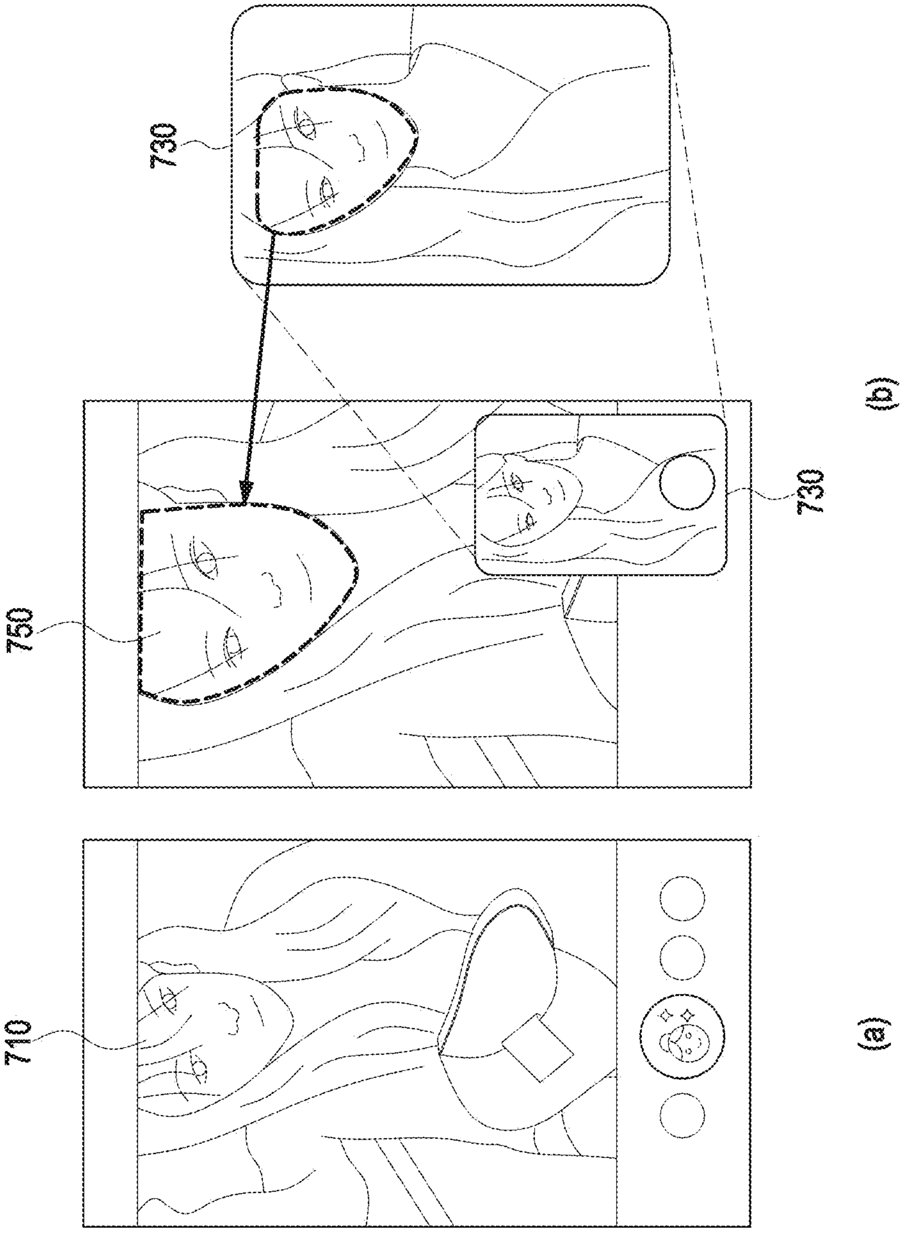
FIG. 7 is a diagram illustrating a method by which an electronic device captures a preview image, based on capturing information of a first image according to one or more embodiments.

FIG. 7 is a diagram illustrating a method by which an electronic device captures a preview image, based on capturing information of a first image according to one or more embodiments.

Referring to FIG. 7A, an electronic device (for example, the electronic device 201 of FIG. 2) according to one or more embodiments may identify capturing information of the first image, based on an editing operation of the first image being performed. For example, the electronic device 201 may identify capturing information (for example, a focal distance, an exposure value, sensitivity, and/or white balance) of the captured first image.

Referring to part (b) of FIG. 7, according to one or more embodiments, the electronic device 201 may control a camera (for example, the camera 210 of FIG. 2) to capture a preview image, based on capturing information (for example, a focal distance, an exposure value, sensitivity, and/or white balance) of the first image. For example, the electronic device 201 may display a captured preview image 730 on a display (for example, the display 260 of FIG. 2) according to the focal distance at which the first image is captured.

According to one or more embodiments, a second image in which at least a portion of a first object 710 (for example, the face included in the first image shown in part (a)) in the first image is transformed or changed to at least a portion 750 of a second object (for example, the face included in the preview image) included in the preview image 730 may be acquired.

Through the above-described method, the electronic device 201 may minimize distortion of the image by using the second object (for example, the second object included in the preview image 730) captured based on capturing information of the first image when at least the portion of the corresponding second object (for example, the face) is reflected in the first image.

Figure 8:
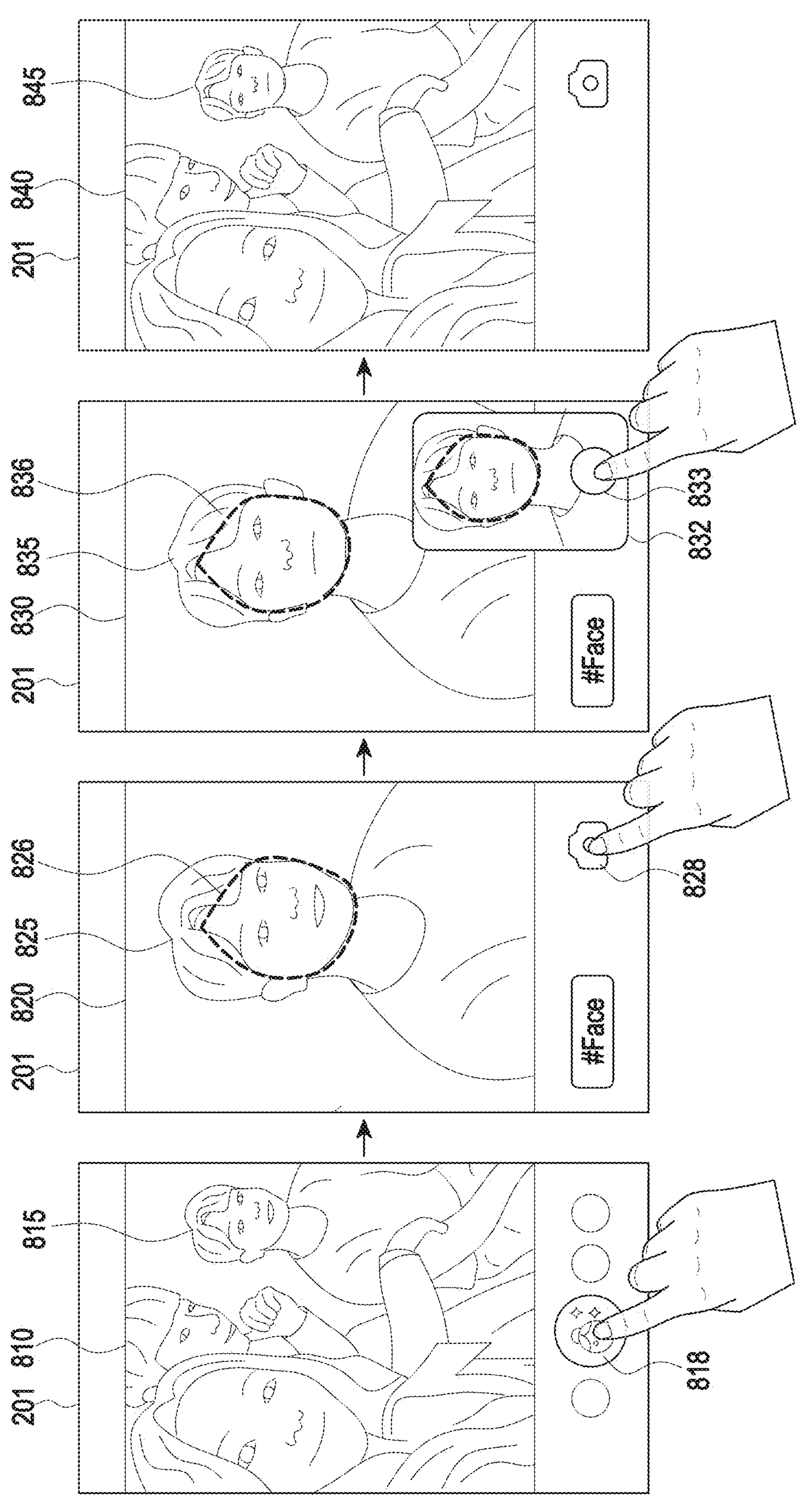
FIG. 8 is a diagram illustrating a method by which an electronic device acquires a second image by using a first image including a plurality of objects and a preview image according to one or more embodiments.

FIG. 8 is a diagram illustrating a method by which an electronic device acquires a second image by using a first image including a plurality of objects and a preview image according to one or more embodiments.

Referring to FIG. 8, according to one or more embodiments, the electronic device 201 may edit a first image 810 including a plurality of objects (for example, a plurality of people). For example, the electronic device 201 may perform an editing operation of the first image 810, based on a user input on a graphic object. The electronic device 201 may identify a first person corresponding to a target to be edited among the plurality of objects, based on the editing operation of the first image 810 being performed. For example, the electronic device 201 may identify the first person 815, based on a user input (for example, a touch input on the first person 815) for the first person 815 among the plurality of objects included in the first image 810. Alternatively, the electronic device 201 may identify the first person 815 among the plurality of objects included in the first image 810, based on an image indicating a user prestored in the electronic device 201.

According to one or more embodiments, based on the first person 815 included in the first image 810 being identified, the electronic device 201 may display an image 820 obtained by enlarging the first image 810, based on a part 825 corresponding to the first person 815, instead of the first image. For example, the electronic device 201 may identify a face part of the first person as a first object 826. According to one or more embodiments, the operation of displaying the enlarged image 820 instead of the first image may be omitted.

According to one or more embodiments, based on a user input on a graphic object 828, the electronic device 201 may display a preview image 832 acquired (or captured) through a camera (for example, the camera 210 of FIG. 2) along with the first image 810 or the image 820 obtained by enlarging the first image on the display 260. For example, the preview image 832 may be captured based on capturing information of the first image 810.

According to one or more embodiments, the electronic device 201 may identify a second object (for example, the user's face) corresponding to the first object included in the preview image 832. The electronic device 201 may acquire and display a second image 830 in which at least a portion of the first object 826 is transformed to at least a portion of the second object 836 by using a generative AI model (for example, the generative AI model 320 of FIG. 3). Alternatively, the electronic device 201 may acquire and display the second image 830 in which at least a portion of the part 825 (for example, a hairstyle and a face position) related to the first object 826 as well as the first object 826 is transformed to the second object 836 and a part 835 related to the second object by using the generative AI model (for example, the generative AI model 320 of FIG. 3). That is, the electronic device 201 may change not only the face in the first image 810 (or the image 820 obtained by enlarging the first image) but also the parts corresponding to the hairstyle, facial expression, position, and/or ears. Further, the part related to the user's face included in the preview image 832 may be reflected in the second image 830 in real time. For example, when the head position of the person included in the preview image 832 is changed, the electronic device 201 may perform an in-painting operation as a solution to an empty area generated in a portion of the background area of the first image (or the original image) at which the person's head was located. For example, when the first object is transformed to the second object (for example, a position change), a background area of the first image around the first object may be partially different from a background area of the first image around the second object. When generating the second image, the electronic device 201 may paint or generate an area (or an image corresponding to the area) due to the difference between the background areas by using the generative AI model.

According to one or more embodiments, the electronic device 201 may acquire an image (or an image file) 840 corresponding to the second image, based on a user input on the object 833 included in the preview image 832. For example, the second image 840 may be an image in which only the face of the first person 845 among the plurality of objects included in the first image 810 and the part related to the face (for example, a face angle, a facial expression, and/or a hairstyle) are changed.

According to the above-described method, the electronic device 201 may effectively and easily acquire an image in which only a specific object (for example, a specific person) is edited in the first image 810 including a plurality of objects.

Figure 9A:
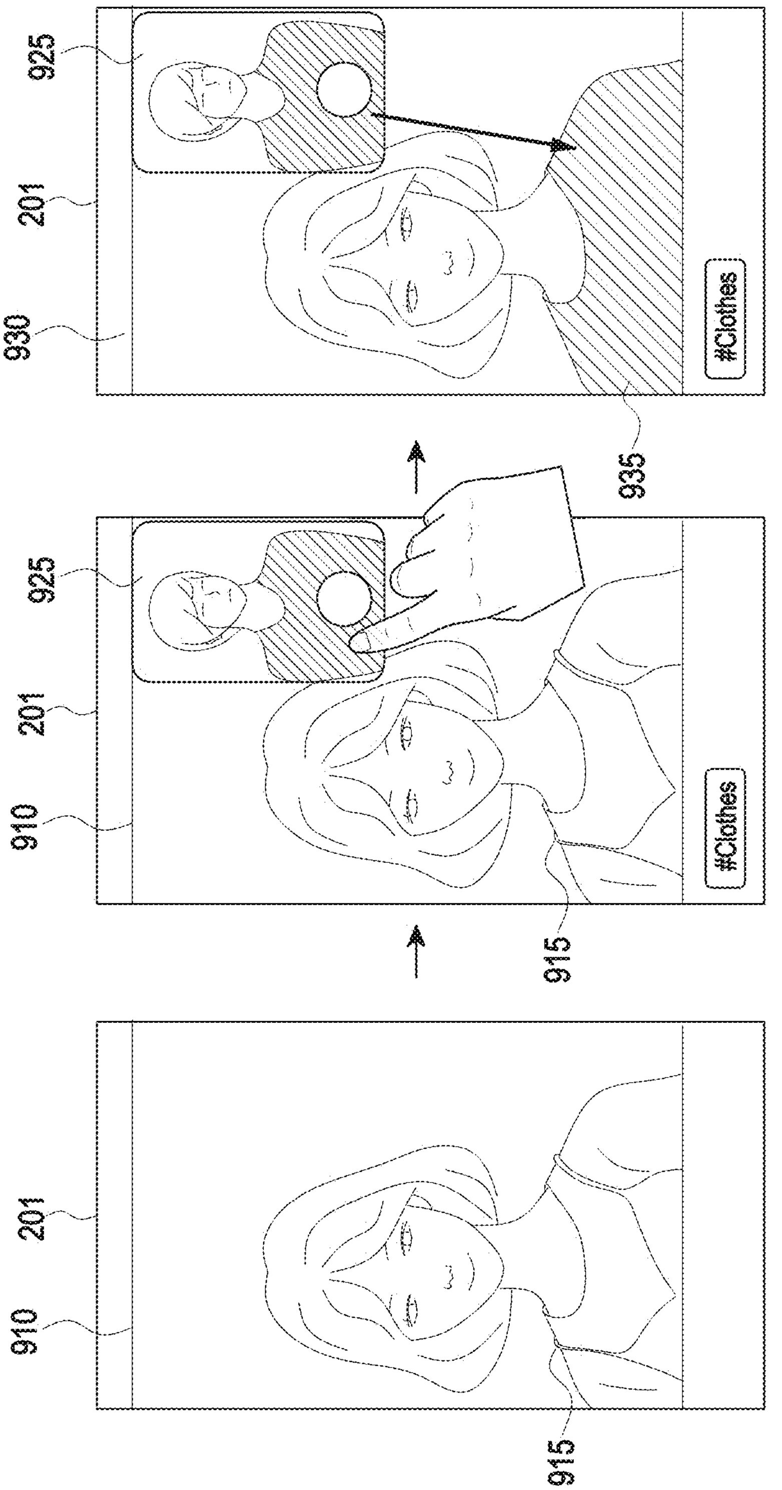
FIGS. 9A, 9B, and 9C are diagrams illustrating a method by which an electronic device acquires a second image according to one or more embodiments.
Figure 9B:
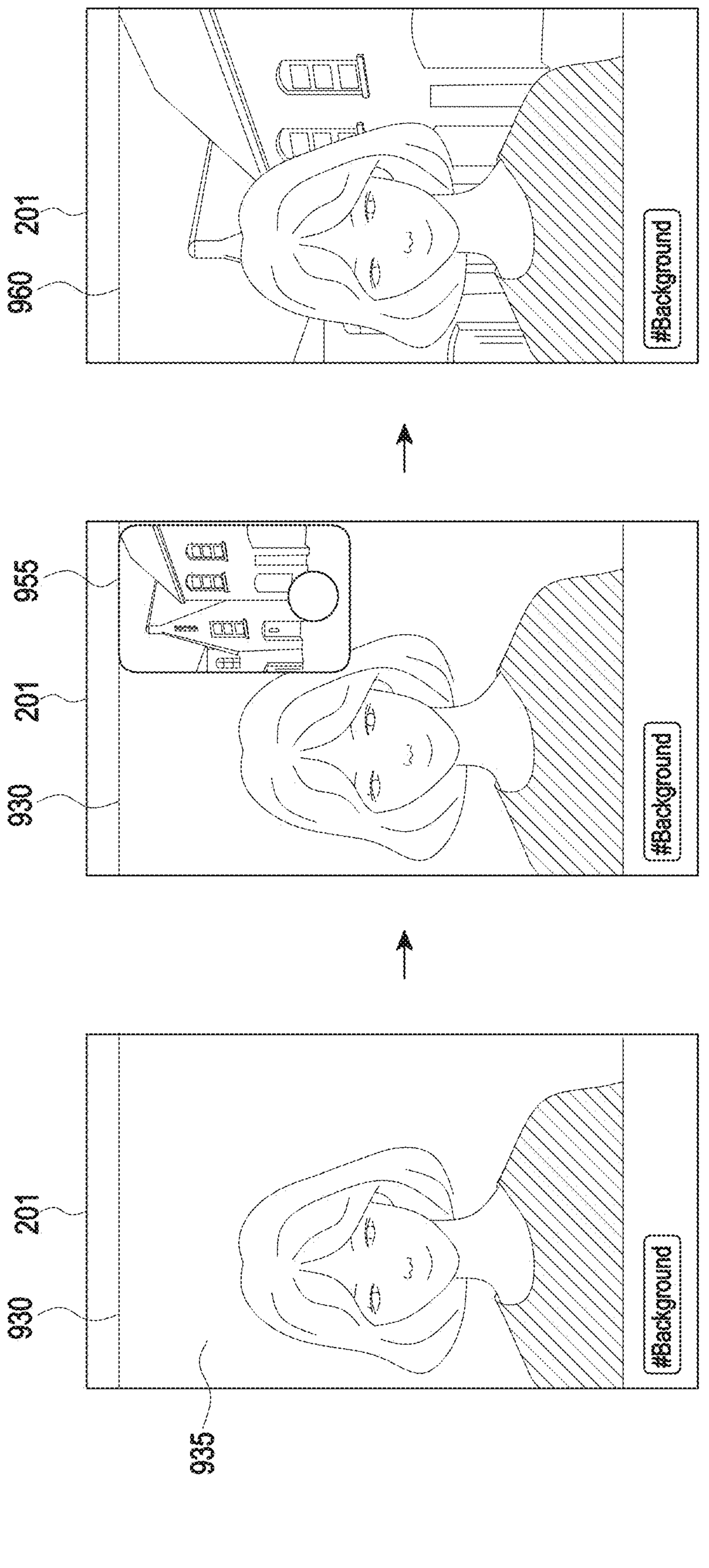
Figure 9C:
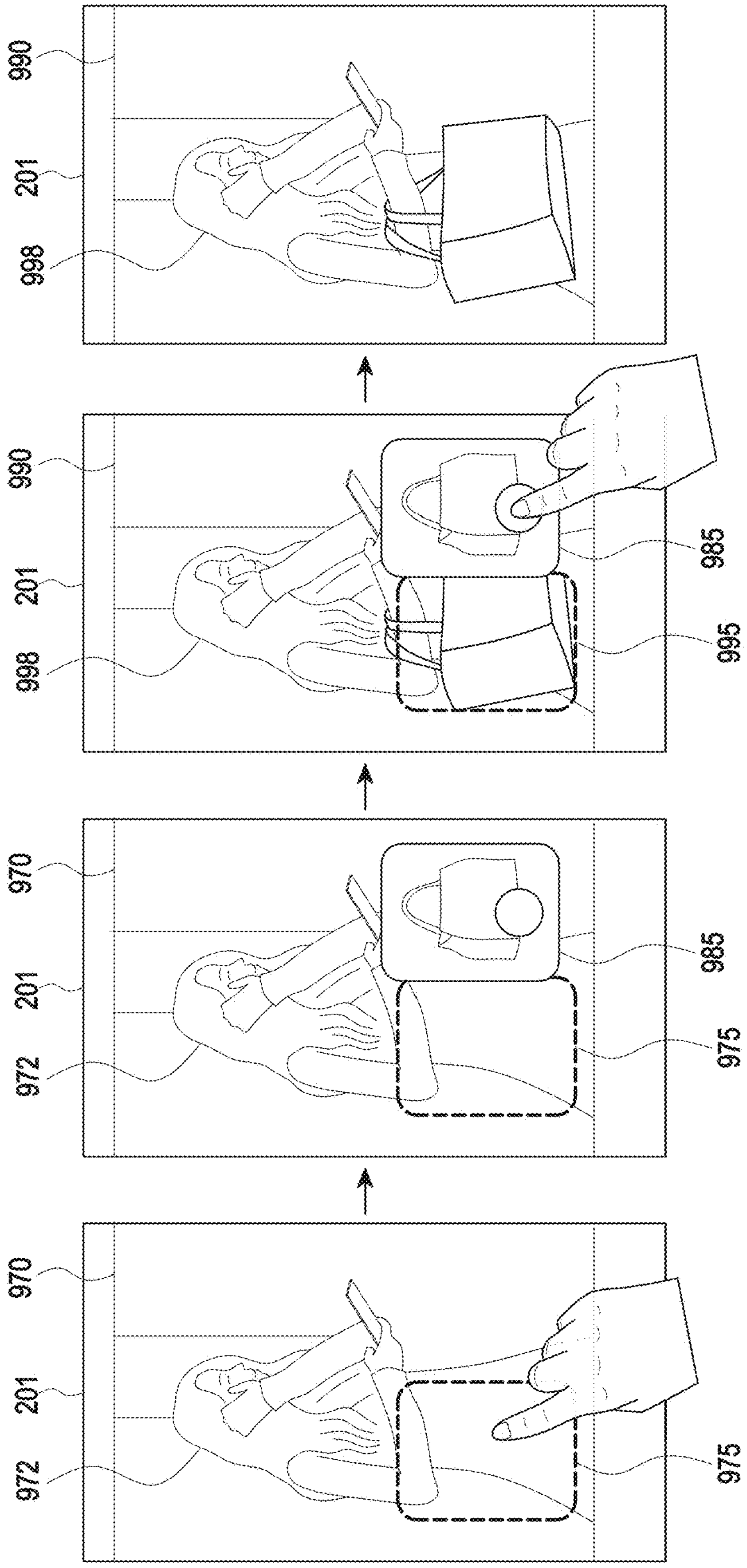

FIGS. 9A, 9B, and 9C are diagrams illustrating a method by which an electronic device acquires a second image according to one or more embodiments.

Referring to FIGS. 9A, 9B, and 9C, according to one or more embodiments, an electronic device (for example, the electronic device 201 of FIG. 2) may edit various parts as well as a person's face included in a first image 910 by using an image generation model (for example, the image generation model 310 of FIG. 3).

Referring to FIG. 9A, according to one or more embodiments, the electronic device 201 may edit person's clothes included in the first image 910 by using the image generation model 310. For example, based on a user input (for example, a touch input) for the person's clothes 915 included in the first image 910, the electronic device 201 may identify the corresponding person's clothes 915. For example, the electronic device 201 may identify an area corresponding to the person's clothes 915, based on a user input for a preview image, and edit the person's clothes 915 in the first image. The electronic device 201 may display a preview image 925 acquired (or captured) through a camera (for example, the camera 210 of FIG. 2), based on the user input, along with the first image 910 on the display 260. For example, the preview image 925 may be captured based on capturing information of the first image 910. Thereafter, the electronic device 201 may acquire and display a second image 930 in which the person's clothes 915 included in the first image 910 are transformed or changed to person's clothes included in the preview image 925.

Referring to FIG. 9B, according to one or more embodiments, the electronic device 201 may edit the background included in the first image 930 by using the image generation model 310. In FIG. 9B, the second image 930 generated in FIG. 9A may be the first image 930 in the illustrated processes. For example, the electronic device 201 may identify a part of the background 935, based on a user input (for example, a touch input) on the background 935 included in the first image 930. The electronic device 201 may display a preview image 955 acquired (or captured) through a camera (for example, the camera 210 of FIG. 2), based on the user input, along with the first image 930 on the display 260. For example, the preview image 955 may be captured based on capturing information of the first image 930. Thereafter, the electronic device 201 may acquire and display a second image 960 in which the background 935 included in the first image 930 is transformed or changed to the background included in the preview image 955.

Referring to FIG. 9C, according to one or more embodiments, the electronic device 201 may edit a part 975 included in the first image 970 by using the image generation model 310. For example, the electronic device 201 may identify the part 975, based on a user input (for example, a touch input) on the part 975 included in the first image 970. The electronic device 201 may display a preview image 985 acquired (or captured) through a camera (for example, the camera 210 of FIG. 2), based on the user input, along with the first image 930 on the display 260. For example, the preview image 985 may be captured based on capturing information of the first image 970 and may include a specific object (for example, a bag). Thereafter, the electronic device 201 may acquire and display a second image 990 in which the part 975 included in the first image 970 is transformed or changed to the specific object (for example, the bag) included in the preview image 985. When adding the specific object to the part 975 of the first image 970, the electronic device 201 may consider a person 998 included in the first image 970. For example, the electronic device 201 may generate the second image 990 such that the person 998 is carrying or holding the specific object. For example, the electronic device 201 may perform an in-painting operation or an out-painting operation for the corresponding part 995 while adding the specific object to the part 975 of the first image 970.

According to one or more embodiments, when a plurality of objects exist in the preview image, the electronic device 201 may identify a user input selecting a specific object (for example, a second object) included in the preview image. The electronic device 201 may generate the second image by adding the second object included in the preview image to the part 975 selected by the user in the first image. Alternatively, when the user selects no area in the first image, the electronic device 201 may analyze an appropriate location of the second object in the first image and determine an area of the first image to which the second area is to be added. The electronic device 201 may generate the second image in which the second object is added to the determined area of the first image.

According to the above-described method, the electronic device 201 may effectively and easily acquire the image in which the specific object or the specific part is edited in the first image 910, 930, or 970.

Figure 10:
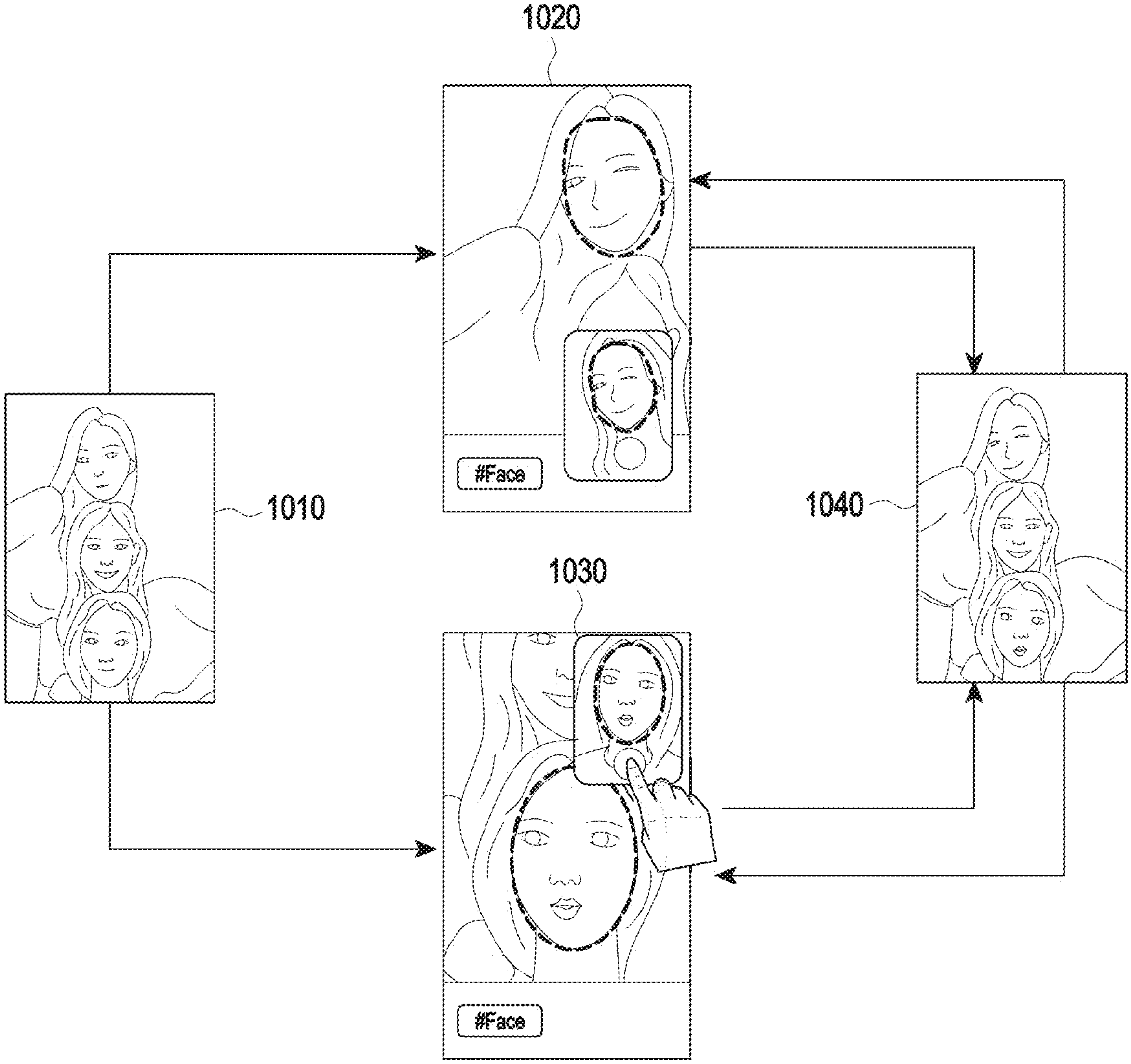
FIG. 10 is a diagram illustrating a method by which a plurality of electronic devices edit a first image stored in a server according to one or more embodiments.

FIG. 10 is a diagram illustrating a method by which a plurality of electronic devices edit a first image stored in a server according to one or more embodiments.

Referring to FIG. 10, according to one or more embodiments, the plurality of electronic devices may edit an image stored in an external server (for example, a cloud server) and acquire edited images.

According to one or more embodiments, a first electronic device may edit a first image 1010 stored in the external server. For example, the first electronic device may acquire a second image 1020 obtained by editing the first image 1010 by using a preview image captured using a camera included in the first electronic device. The first electronic device may store the acquired second image 1020 in the external server.

According to one or more embodiments, a first electronic device may edit a first image 1010 stored in the external server. For example, a second electronic device may acquire a third image 1030 obtained by editing the first image 1010 by using a preview image captured using a camera included in the second electronic device. The second electronic device may store the acquired third image 1030 in the external server. For example, the second electronic device may edit the first image at substantially the same time point as the first electronic device.

According to one or more embodiments, the external server may acquire and store a fourth image, based on the second image edited by the first electronic device and the third image edited by the second electronic device. For example, the fourth image may be an image in which the part edited by the first electronic device and the part edited by the second electronic device in the first image 1010 are reflected.

According to one or more embodiments, the first electronic device and the second electronic device may acquire a fourth image 1040 from the external server.

Through the above-described method, an electronic device (for example, the first electronic device) (for example, the electronic device 201 of FIG. 2) may easily acquire an image edited by another electronic device (for example, the second electronic device). Further, the electronic device may provide a method of effectively editing an image together with another electronic device. According thereto, the electronic device may efficiently cooperate with another electronic device to provide a function of editing an image. At least some of the operations performed by the external server may be performed by the first electronic device or the second electronic device. Alternatively, at least some of the operations performed by the external server may be performed by the first electronic device or the second electronic device. The function of editing the image may be performed by the first electronic device and the second electronic device (for example, device to device) without any external server.

Figure 11:
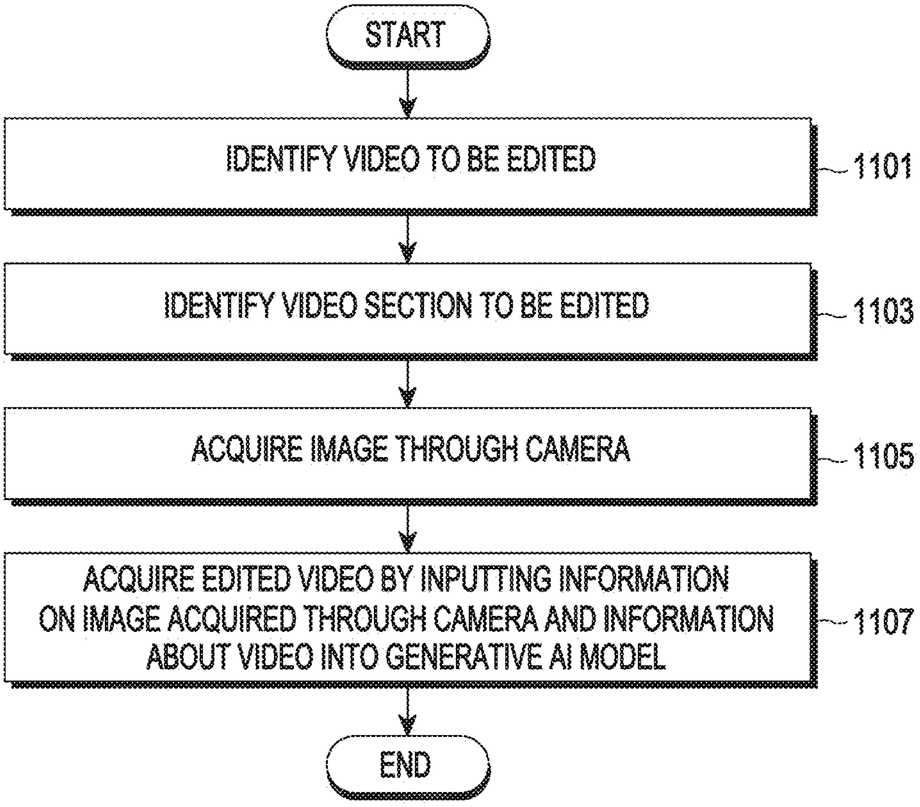
FIG. 11 is a flowchart illustrating a method by which an electronic device edits a video by using a preview image according to one or more embodiments.

FIG. 11 is a flowchart illustrating a method by which an electronic device edits a video by using a preview image according to one or more embodiments.

Referring to FIG. 11, according to one or more embodiments, an electronic device (for example, the electronic device 201 of FIG. 2) may provide a function of editing a video as well as a still image by using an image generation model (for example, the image generation model 310 of FIG. 3).

According to one or more embodiments, in operation 1101, the electronic device 201 may identify a video to be edited.

According to one or more embodiments, in operation 1103, the electronic device 201 may identify a video section to be edited in the video. For example, the electronic device 201 may identify a section (for example, a section from a first time point to a second time point) requested to be edited in entire sections of the video, based on a user input.

According to one or more embodiments, in operation 1105, the electronic device 201 may acquire an image (or a preview image) for editing the video through a camera (for example, the camera 210 of FIG. 2). For example, the electronic device 201 may acquire an image (or a preview image) including a user's face through the camera 210.

According to one or more embodiments, in operation 1107, the electronic device 201 may acquire an edited video by inputting information about the image (for example, information about an object included in the corresponding image) acquired through the camera 210 and information about the video into a generative AI model. For example, the electronic device 201 may acquire a video in which a first object (for example, a face of a specific person included in the video) included in the video during a section requested to be edited is changed or transformed to a second object (for example, a face of a specific person included in the preview image) included in the image acquired through the camera 210. Alternatively, the electronic device 201 may add a new video generated based on the image or video acquired through the camera during the video section requested to be edited. For example, the electronic device 201 may acquire or identify a video including the second object during a specific time by using the video (or preview video) acquired through the camera 210 and add the new video generated based on the acquired video to a specific section of the original video.

Through the above-described method, the electronic device 201 may provide the function of easily and effectively editing the video as well as the still image.

Figure 12:
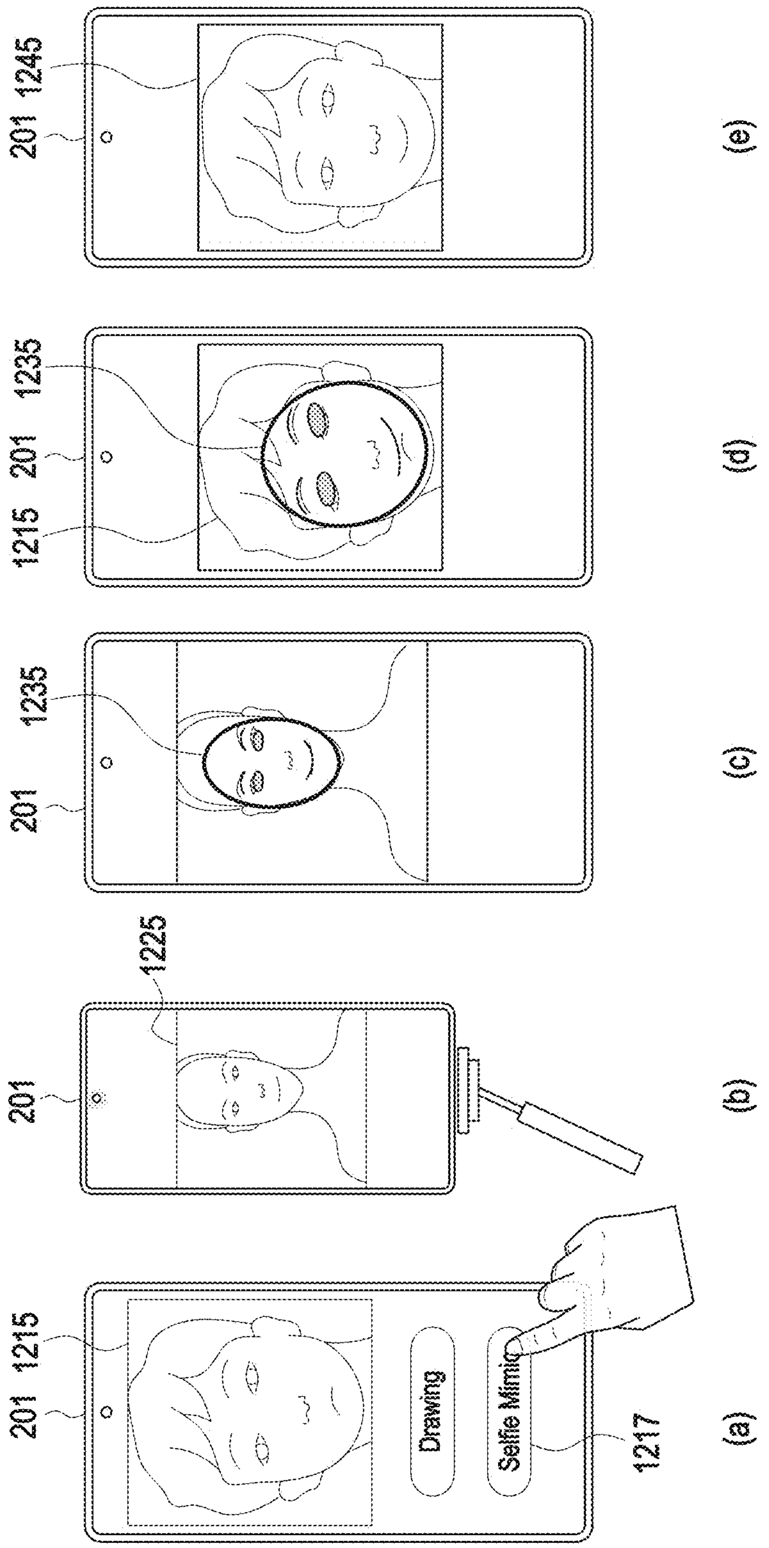
FIG. 12 is a diagram illustrating a method by which an electronic device edits a first image by using an image captured through a camera according to one or more embodiments.

FIG. 12 is a diagram illustrating a method by which an electronic device edits a first image by using an image captured through a camera according to one or more embodiments.

Referring to FIG. 12, according to one or more embodiments, an electronic device (for example, the electronic device 201 of FIG. 2) may edit a first image 1215 including a first object (for example, a person's face). For example, referring to part (a) of FIG. 12, the electronic device 201 may perform an editing operation of the first image 1215, based on a user input for a graphic object 1217.

Referring to part (b) of FIG. 12, according to one or more embodiments, the electronic device 201 may display a preview image 1225 acquired (or captured) through a camera (for example, the camera 210 of FIG. 2) on a display (for example, the display 260 of FIG. 2), based on a user input for a graphic object 1217. For example, the preview image 1225 may be captured based on capturing information of the first image 1215.

According to one or more embodiments, the electronic device 201 may identify, in the preview image 1225, a second object (for example, face) corresponding to the face included in the first image 1215. For example, referring to part (c) of FIG. 12, the electronic device 201 may display a drawing image 1235 indicating features of the second object included in the preview image 1225. For example, the drawing image 1235 may be displayed on the preview image 1225 and may be generated based on the features of the second object (for example, the size and shape of the face, locations and shapes of ears, eyes, mouth, and nose, and/or the facial expression).

According to one or more embodiments, the electronic device 201 may display the drawing image 1235 on the first image 1215. The electronic device 201 may adjust the facial expression or the locations of ears, eyes, mouth, and nose represented by the drawing image, based on a user input for the drawing image 1235.

According to one or more embodiments, the electronic device 201 may acquire and display a second image 1245 in which the facial expression or at least a portion of the ears, eyes, mouth, and nose is changed in the first image 1215, based on the adjusted drawing image 1235.

According to the above-described method, the electronic device 201 may effectively and easily edit the person's face included in the first image 1215.

Figure 13:
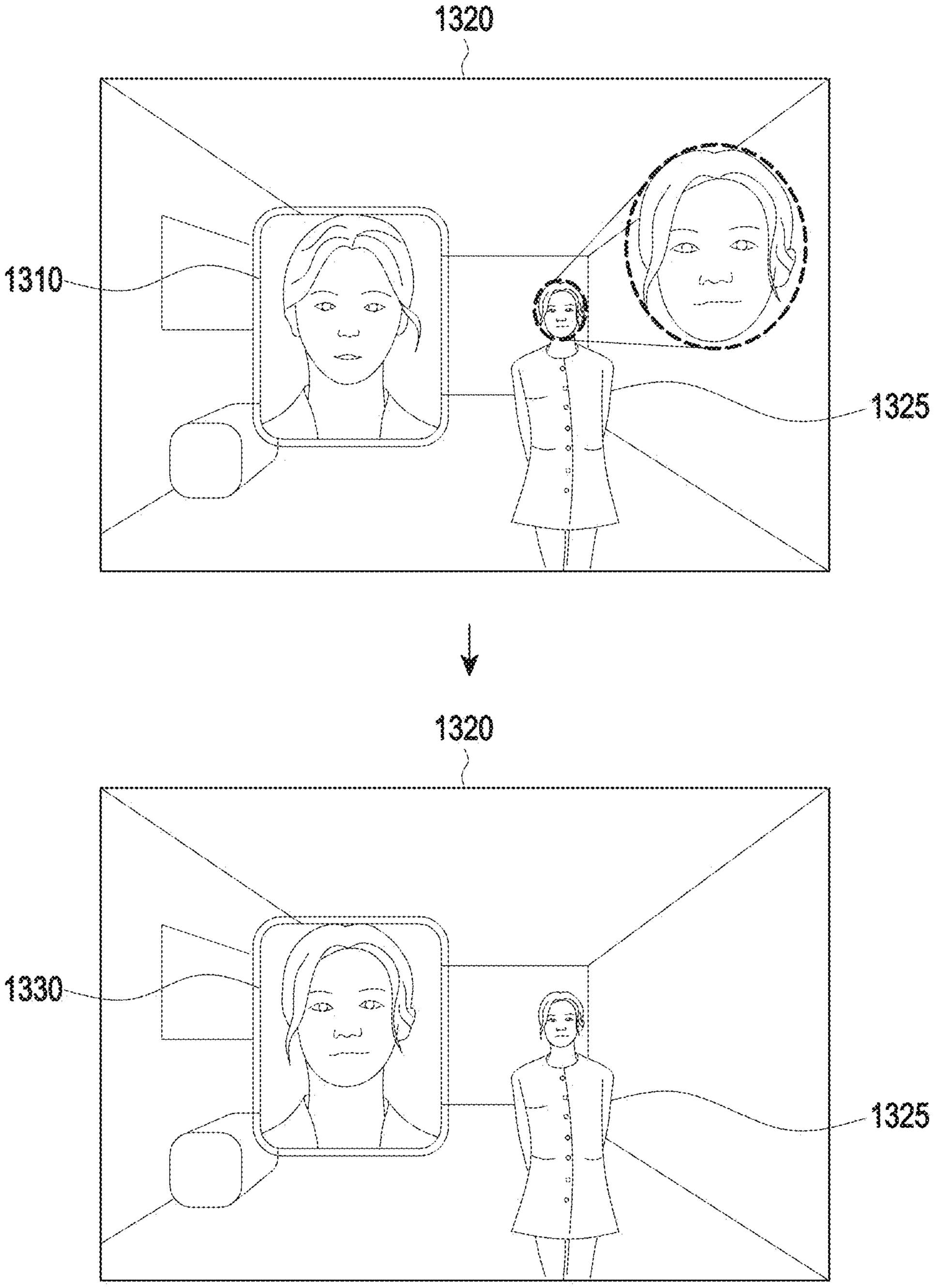
FIG. 13 is a diagram illustrating a method of acquiring a second image when an electronic device is a video see-through (VST) device according to one or more embodiments.

FIG. 13 is a diagram illustrating a method of acquiring a second image when an electronic device is a VST device according to one or more embodiments.

According to one or more embodiments, the electronic device 201 may be implemented as a VST device. For example, the electronic device 201 may display a screen 1320 captured through a camera (for example, the camera 210 of FIG. 2) on a display (for example, the display 260 of FIG. 2). For example, the screen 1320 may include an augmented reality (AR) screen, a virtual reality (VR) screen, or an extended reality (XR) screen.

According to one or more embodiments, the electronic device (or VST device) 201 may edit an object (for example, the person's face) included in the first image 1310 stored in the electronic device 201 by using an image generation model (for example, the image generation model 310 of FIG. 3). The electronic device 201 may display the first image 1310 on the screen 1320 acquired (or captured) through a camera (for example, the camera 210 of FIG. 2). The electronic device 201 may acquire and display a second image 1330 in which the person's face included in the first image 1310 is transformed or changed to the person's face included in the screen 1325.

Through the above-described method, when the electronic device 201 is implemented as the VST device, the electronic device 201 may provide a function of easily and effectively editing the first image 1310.

Figure 14:
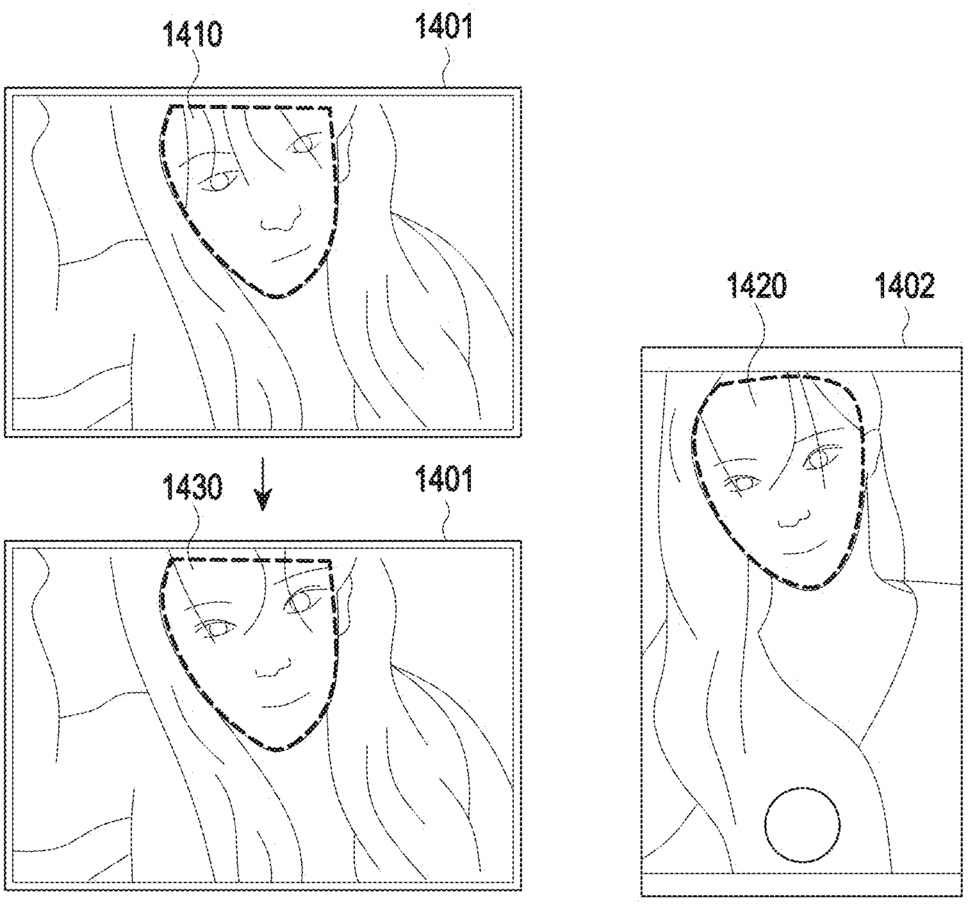
FIG. 14 is a diagram illustrating a method by which an electronic device edits a first image by using a preview image captured by an external electronic device according to one or more embodiments.

FIG. 14 is a diagram illustrating a method by which an electronic device edits a first image by using a preview image captured by an external electronic device according to one or more embodiments.

Referring to FIG. 14, according to one or more embodiments, an electronic device 1401 (for example, the electronic device 201 of FIG. 2) may edit a first image 1410. The electronic device 1401 may edit the first image 1410 by using a preview image 1420 captured by an external electronic device 1402 instead of a camera included in the electronic device 1401.

According to one or more embodiments, the electronic device 1401 may receive information about a preview image 1420 captured by the external electronic device 1402 from the external electronic device 1402 through a communication circuit (for example, the communication circuit 290 of FIG. 2). For example, the electronic device 1401 may receive information about the preview image 1420 captured in real time by the external electronic device 1402. The electronic device 1401 may acquire a second image 1430 by inputting the first image 1410 and the information about the preview image 1420 into an image generation model (for example, the image generation model 310 of FIG. 3). For example, the second image 1430 may be an image in which a first object (for example, the face) included in the first image 1410 is changed or transformed to a second object (for example, the face) included in the preview image 1420.

Figure 15:
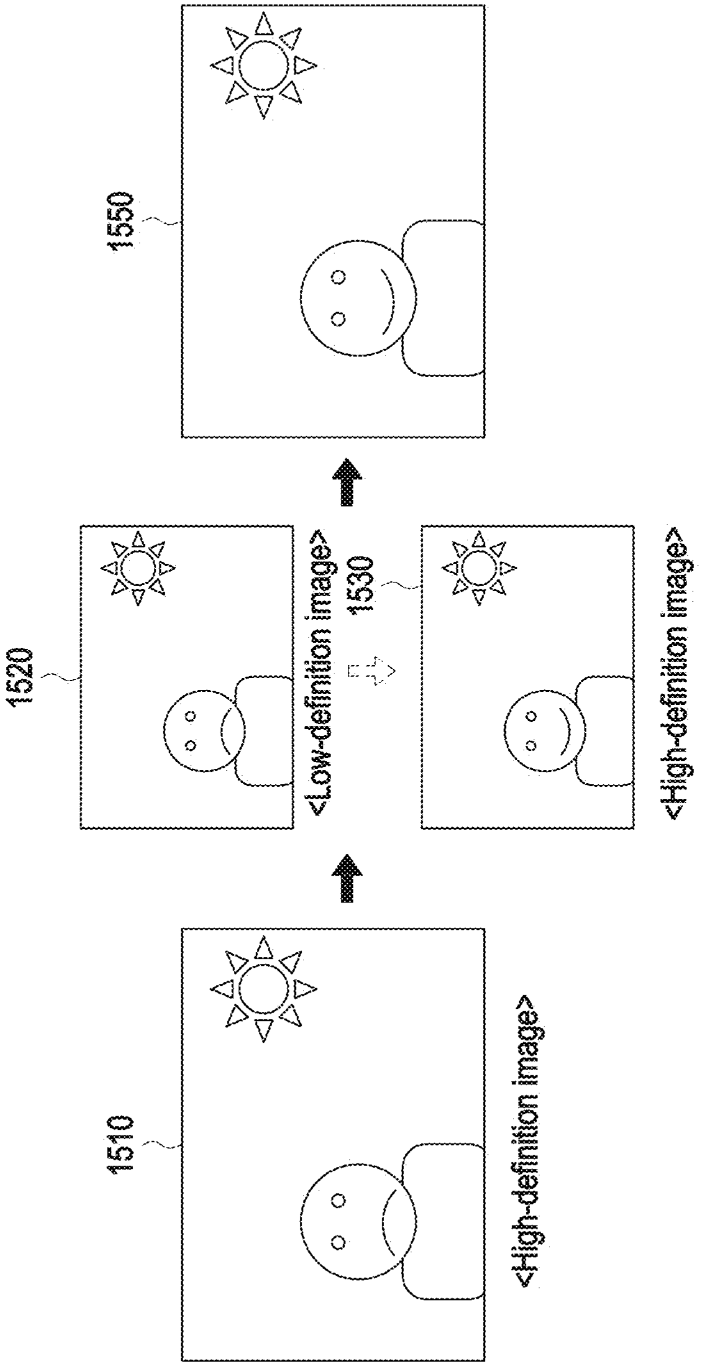
FIG. 15 is a diagram illustrating a method by which an electronic device acquires a second image, based on a preview image having an image quality different from that of a first image according to one or more embodiments.

FIG. 15 is a diagram illustrating a method by which an electronic device acquires a second image, based on a preview image having an image quality different from that of a first image according to one or more embodiments.

Referring to FIG. 15, according to one or more embodiments, an electronic device (for example, the electronic device 201 of FIG. 2) may edit a first image 1510 by using an image 1520 (for example, a preview image) acquired through a camera (for example, the camera 210 of FIG. 2). The image quality (or resolution) of the image 1520 acquired through the camera 210 may be different from the image quality (or resolution) of the first image 1510. For example, the first image 1510 may be a high-definition image (or a high-resolution image), and the image 1520 acquired through the camera 210 may be low-definition image (or a low-resolution image).

When there is difference in the image quality (or difference in the resolution) between the first image 1510 and the image 1520 acquired through the camera, blur may occur in the image to be acquired.

According to one or more embodiments, the electronic device 201 may change the image 1520 acquired through the camera 210 to have the high definition. For example, the electronic device 201 may change the image quality of the corresponding image 1520 to be the same as that of the first image 1510 by using a resolution expansion function (for example, a super resolution function). That is, the electronic device 201 may acquire an image 1530 of which the image quality is changed using the resolution expansion function (for example, super resolution function).

According to one or more embodiments, the electronic device 201 may acquire a second image 1550 in which a specific object is changed in the first image 1510 by using the image 1530 of which the image quality has been changed.

According to one or more embodiments, the first image 1510 may be a low-definition image (or a low-resolution image), and the image acquired through the camera 210 may be a high-definition image (or a high-resolution image). The electronic device 201 may change the image acquired through the camera 210 to have the low definition. For example, the electronic device 201 may change the image quality of the corresponding image to be the same as that of the first image 1510 by using a down scanning function. According to one or more embodiments, the electronic device 201 may change the first image 1510 to have the high definition.

According to the above-described method, the electronic device 201 may adjust the difference in the image quality (or the difference in the resolution) between the first image 1510 and the image 1520 acquired through the camera. According thereto, the electronic device 201 may minimize the occurrence of blur in the edited image.

Figure 16:
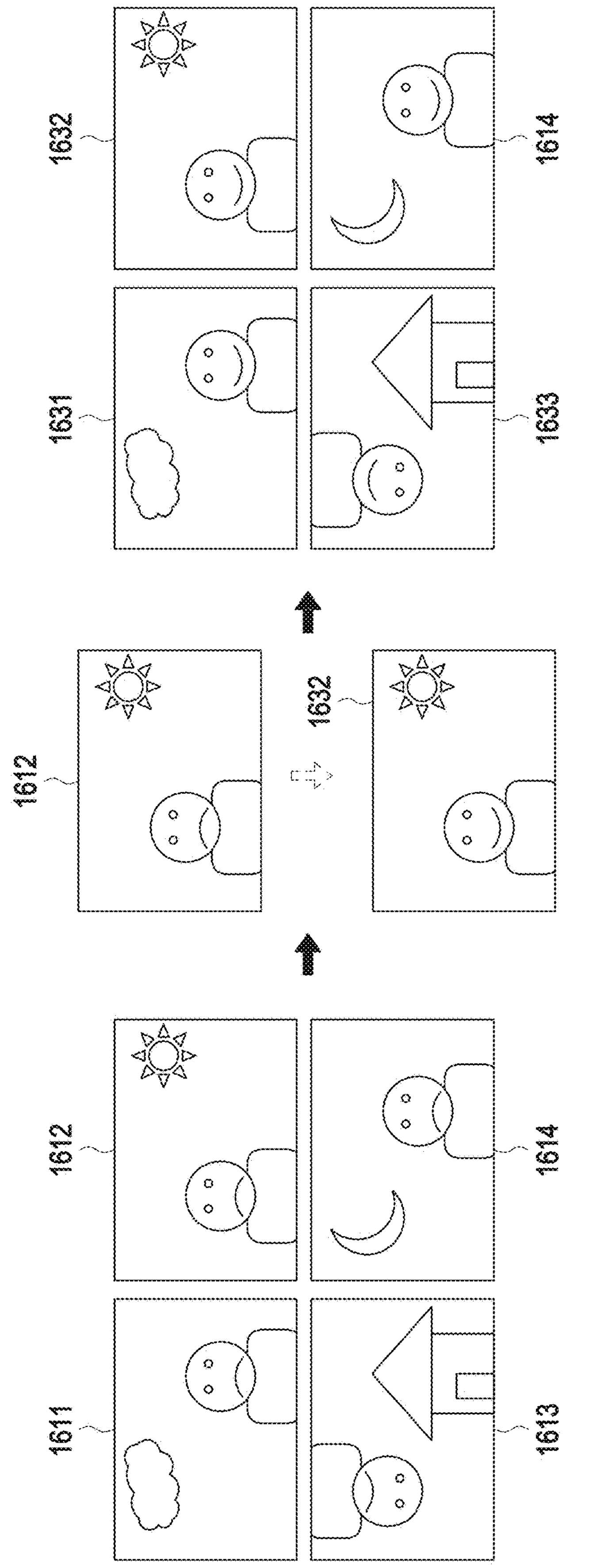
FIG. 16 is a diagram illustrating a method by which an electronic device edits a plurality of images including a same object stored in memory by using a preview image captured through a camera according to one or more embodiments.

FIG. 16 is a diagram illustrating a method by which an electronic device edits a plurality of images including a same object stored in memory by using a preview image captured through a camera according to one or more embodiments.

Referring to FIG. 16, according to one or more embodiments, an electronic device (for example, the electronic device 201 of FIG. 2) may identify at least one image 1611, 1612, 1613, and 1614 including a first object (for example, a specific person) stored in memory (for example, the memory 230 of FIG. 2). For example, the electronic device 201 may identify at least one image 1611, 1612, 1613, and 1614 including a first object, based on a folder or classification designated by a photo application.

According to one or more embodiments, the electronic device 201 may change the first object (for example, the person's face) included in at least one image 1611, 1612, 1613, and 1614 by using an image acquired through a camera (for example, the camera 210 of FIG. 2). For example, the electronic device 201 may change the first object (for example, the person's face) included in at least one image 1611, 1612, 1613, and 1614 to a second object (for example, the person's face) included in the image acquired through the camera 210.

According to one or more embodiments, the electronic device may acquire an image 1632 in which a first object included in a specific image 1612 of at least one image 1611, 1612, 1613, and 1614 is changed to a second object included in the image acquired through the camera 210 by using an image generation model (for example, the image generation model 310 of FIG. 3) (or the generative AI model 320). Further, the electronic device 201 may acquire at least one second image 1631, 1632, 1633, and 1634 in which at least a portion of the first object included in at least one image 1611, 1612, 1613, and 1614 is changed to at least a portion of the second object by inputting at least one image 1611, 1612, 1613, and 1614 and information about the second object into the image generation model 310 (or the generative AI model 320).

According to one or more embodiments, the electronic device 201 may display at least one second image 1631, 1632, 1633, and 1634 on a display (for example, the display 260 of FIG. 2). The electronic device 201 may acquire and store an image file corresponding to an image selected by a user input from among at least one second image 1631, 1632, 1633, and 1634 displayed on the display 260. As shown in FIG. 16, the frown of the face in images 1611, 1612, 1613 and 1614 may be transformed into a smile as shown in images 1631, 1633, 1634 based on identifying a similar image between 1612 with a frown and image 1632 with a smile.

According to the above-described method, the electronic device 201 may simultaneously edit the first object included in the plurality of images to a second object included in an image acquired through the camera 210.

According to one or more embodiments, the electronic device 201 may include the camera 210, the display 260, at least one processor 220, and the memory 230 including instructions. According to one or more embodiments, the instructions may cause, when executed by the at least one processor, the electronic device to display a first image, stored in the memory and that includes a first object stored through the display. According to one or more embodiments, the instructions may cause, when executed by the at least one processor, the electronic device to display, through the display, a preview image acquired from the camera along with the first image. According to one or more embodiments, the instructions may cause, when executed by the at least one processor, the electronic device to identify a second object included in the preview image. According to one or more embodiments, the instructions may cause, when executed by the at least one processor, the electronic device to identify the first object related to the second object in the first image, based on at least a portion of the second object. According to one or more embodiments, the instructions may cause, when executed by the at least one processor, the electronic device to generate a second image by editing the first image through a generative AI model 320 to transform at least a portion of the first object, based on at least the portion of the second object. According to one or more embodiments, the instructions may cause, when executed by the at least one processor, the electronic device to display the second image through the display.

According to one or more embodiments, the instructions may cause, when executed by the at least one processor, the electronic device to identify metadata information about the first image. According to one or more embodiments, the metadata information may include at least one piece of focal distance information, shutter speed information, and location information of the first object. According to one or more embodiments, the instructions may cause, when executed by the at least one processor, the electronic device to control the camera to generate the second image, based on at least a portion of the second object and the metadata information.

According to one or more embodiments, the instructions may cause, when executed by the at least one processor, the electronic device to display the preview image on the first image not to overlap the first object included in the first image.

According to one or more embodiments, the instructions may cause, when executed by the at least one processor, the electronic device to display the second image in real time.

According to one or more embodiments, the instructions may cause, when executed by the at least one processor, the electronic device to, based on the first object being identified in the first image, replace the first image with an image obtained by enlarging the first image, based on a part corresponding to the first object, through the display.

According to one or more embodiments, the instructions may cause, when executed by the at least one processor, the electronic device to display the preview image along with the second image. According to one or more embodiments, the instructions may cause, when executed by the at least one processor, the electronic device to, in response to a user input for the preview image, generate an image file corresponding to the second image.

According to one or more embodiments, the instructions may cause, when executed by the at least one processor, the electronic device to display a graphic object for displaying the preview image through the display. According to one or more embodiments, the instructions may cause, when executed by the at least one processor, the electronic device to, in response to a user input for the graphic object, display the preview image through the display.

According to one or more embodiments, the instructions may cause, when executed by the at least one processor, the electronic device to perform a face detection function for the preview image. According to one or more embodiments, the instructions may cause, when executed by the at least one processor, the electronic device to, based on the face detection function, identify a user's face included in the preview image as the second object.

According to one or more embodiments, the instructions may cause, when executed by the at least one processor, the electronic device to, based on a face recognition function being performed for the user's face, identify, as the first object, a face corresponding to the user's face included in the preview image among at least one face included in the first image.

According to one or more embodiments, the instructions may cause, when executed by the at least one processor, the electronic device to, as at least a part of the generating of the second image, in-painting for the first image by using the generative AI model.

According to one or more embodiments, the instructions may cause, when executed by the at least one processor, the electronic device to generate at least two text prompts for features of the second object. According to one or more embodiments, the instructions may cause, when executed by the at least one processor, the electronic device to generate the second image, based on the at least two text prompts and the second object, by using the generative AI model.

According to one or more embodiments, the instructions may cause, when executed by the at least one processor, the electronic device to, as at least a part of the generating of the second image, transmit information including at least the portion of the first image and the second object to an external server to generate the second image by using a generative AI model stored in the external server. According to one or more embodiments, the instructions may cause, when executed by the at least one processor, the electronic device to receive the second image from the external server.

According to one or more embodiments, the instructions may cause, when executed by the at least one processor, the electronic device to identify at least one third image including an object corresponding the first object stored in the memory. According to one or more embodiments, the instructions may cause, when executed by the at least one processor, the electronic device to acquire at least one fourth image by using the generative AI model to change at least a portion of the object included in the at least one third image, based on at least the portion of the second object. According to one or more embodiments, the instructions may cause, when executed by the at least one processor, the electronic device to display the at least one fourth image on the display.

According to one or more embodiments, the instructions may cause, when executed by the at least one processor, the electronic device to, as the preview image, an image captured (or taken) by an external electronic device from the external electronic device.

A method of operating the electronic device 201 according to one or more embodiments may include an operation of displaying a first image, stored in the electronic device that includes a first object through the display 260 included in the electronic device. According to one or more embodiments, the method of operating the electronic device may include an operation of displaying, through the display, a preview image acquired from the camera 210 included in the electronic device along with the first image. According to one or more embodiments, the method of operating the electronic device may include an operation of identifying a second object included in the preview image. According to one or more embodiments, the method of operating the electronic device may include an operation of identifying the first object related to the second object in the first image, based on at least a portion of the second object. According to one or more embodiments, the method of operating the electronic device may include an operation of generating a second image by editing the first image through a generative AI model 320 to transform at least a portion of the first object, based on at least the portion of the second object. According to one or more embodiments, the method of operating the electronic device may include an operation of displaying the second image through the display.

According to one or more embodiments, the operation of displaying the second image may include an operation of identifying metadata information about the first image. According to one or more embodiments, the metadata information may include at least one piece of focal distance information, shutter speed information, and location information of the second object. According to one or more embodiments, the operation of generating the second image may include an operation of generating the second image, based on at least the portion of the second object and the metadata information.

According to one or more embodiments, the operation of displaying the preview image may include displaying the preview image on the first image not to overlap the first object included in the first image.

According to one or more embodiments, the operation of displaying the second image may include an operation of displaying the second image in real time.

According to one or more embodiments, the method of operating the electronic device may further include an operation of, based on the first object being identified in the first image, replacing the first image with an image obtained by enlarging the first image, based on a part corresponding to the first object, through the display.

A non-transitory, computer readable recording medium 130 or 230 according to one or more embodiments may store instructions that, when executed by at least one processor, cause the at least one processor to display a first image, stored in the electronic device and including a first object, through the display 260 included in the electronic device, an display, through the display, a preview image acquired from the camera 210 included in the electronic device along with the first image, identify a second object included in the preview image, identify the first object related to the second object in the first image, based on at least a portion of the second object, generate a second image by editing the first image through the generative AI model 320 to transform at least a portion of the first object, based on at least the portion of the second object, and display the second image through the display.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Each of the embodiments provided in the above description is not excluded from being associated with one or more features of another example or another embodiment also provided herein or not provided herein but consistent with the disclosure.

The embodiments of the disclosure disclosed in the specification and the drawings provide merely specific examples to easily describe technical content according to the embodiments of the disclosure and help the understanding of the embodiments of the disclosure, not intended to limit the scope of the embodiments of the disclosure. Accordingly, the scope of various embodiments of the disclosure should be interpreted as encompassing all modifications or variations derived based on the technical spirit of various embodiments of the disclosure in addition to the embodiments disclosed herein.

What is claimed is:

1. An electronic device comprising,
a camera;
a display;
at least one processor; and
memory storing instructions that, when executed by the at least one processor, cause the electronic device to:
display, via the display, a first image,
display, via the display, a preview image concurrently with the first image, the preview image being obtained by the camera,
identify a second object in the preview image, based on the second object, identify a first object in the first image that is related to the second object in the preview image, generate a second image by editing the first image using a generative artificial intelligence (AI) model such that at least a portion of the first object is transformed based on the second object, and display, via the display, the second image.

2. The electronic device of claim 1, wherein the instructions, when executed by the at least one processor, further cause the electronic device to:

identify metadata information about the first image, the metadata information comprising at least one of focal length information, shutter speed information, and location information of the first object; and generate the second image based on the second object and the metadata information.

3. The electronic device of claim 1, wherein the instructions, when executed by the at least one processor, further cause the electronic device to:

display the preview image on the first image while not overlapping the first object in the first image.

4. The electronic device of claim 1, wherein the instructions, when executed by the at least one processor, further cause the electronic device to:

display, via the display, the second image in real time.

5. The electronic device of claim 1, wherein the instructions, when executed by the at least one processor, further cause the electronic device to:

identify the first object in the first image, and replace the first image with a third image in which a portion corresponding to the first object is enlarged.

6. The electronic device of claim 1, wherein the instructions, when executed by the at least one processor, further cause the electronic device to:

display, via the display, the preview image together with the second image, and in response to a user input corresponding to the preview image, generate an image file corresponding to the second image.

7. The electronic device of claim 1, wherein the instructions, when executed by the at least one processor, further cause the electronic device to:

display, via the display, a graphic object, and in response to a user input corresponding to the graphic object, display the preview image on the first image.

8. The electronic device of claim 1, wherein the instructions, when executed by the at least one processor, further cause the electronic device to:

perform a face detection function on the preview image; and identify a user's face in the preview image as the second object based on the face detection function.

9. The electronic device of claim 8, wherein the instructions, when executed by the at least one processor, further cause the electronic device to:

based on performing a face recognition function on the user's face, identify, as the first object, a face in the first image corresponding to the user's face in the preview image among at least one face in the first image.

10. The electronic device of claim 1, wherein the instructions, when executed by the at least one processor, cause the electronic device to generate the second image by performing in-painting on the first image using the generative AI model.

11. The electronic device of claim 1, wherein the instructions, when executed by the at least one processor, further cause the electronic device to:

generate at least two text prompts with respect to characteristics of the second object, and generate the second image based on the at least two text prompts and the second object using the generative AI model.

12. The electronic device of claim 1, wherein the instructions, when executed by the at least one processor, further cause the electronic device to generate the second image by:

transmitting information comprising at least one portion of the first image and the second object to an external server configured to generate the second image using the generative AI model, the generative AI model being stored in the external server, and receive the second image from the external server.

13. The electronic device of claim 1, wherein the instructions, when executed by the at least one processor, further cause the electronic device to:

identify at least one third image including a third object corresponding to the first object, generate at least one fourth image using the generative AI model such that at least a portion of the third object is transformed based on the second object; and display, via the display, the at least one fourth image.

14. The electronic device of claim 1, wherein the preview image is obtained by an external electronic device, and wherein the instructions, when executed by the at least one processor, further cause the electronic device to receive the preview image from the external electronic device.

15. A method of operating an electronic device, the method comprising:

displaying a first image via a display of the electronic device;

displaying, via the display, a preview image concurrently with the first image, the preview image being obtained by a camera of the electronic device;

identifying a second object in the preview image;

identifying, based on a portion of the second object, a first object in the first image that is related to the second object in the preview image;

generating a second image by editing the first image using a generative artificial intelligence (AI) model such that a portion of the first object is transformed based on the portion of the second object; and displaying, via the display, the second image.

16. The method of claim 15, wherein the generating of the second image comprises:

identifying metadata information about the first image, the metadata information comprising at least one of focal distance information, shutter speed information, and location information of the first object; and generating the second image, based on the portion of the second object and the metadata information.

17. The method of claim 15, wherein the displaying of the preview image comprises displaying the preview image on the first image while not overlapping the first object in the first image.

18. The method of claim 15, wherein the displaying of the second image comprises displaying the second image in real time.

19. The method of claim 15, further comprising:

identifying the first object in the first image, and replacing the first image with a third image in which corresponding to the first object is enlarged.

20. A non-transitory, computer-readable, recording medium storing instructions that, when executed by at least one processor, cause the at least one processor to:

display a first image stored in a memory;

display a preview image concurrently with the first image, the preview image being obtained by a camera;

identify a second object in the preview image;

identify, based on a portion of the second object, a first object in the first image that is related to the second object in the preview image;

generate a second image by editing the first image using a generative artificial intelligence (AI) model such that a portion of the first object is transformed based on the portion of the second object; and display the second image.

* * * * *